US011075738B2

(12) United States Patent
Chiang et al.

(10) Patent No.: US 11,075,738 B2
(45) Date of Patent: Jul. 27, 2021

(54) FRACTIONAL FREQUENCY REUSE SCHEMES ASSIGNED TO RADIO NODES IN AN LTE NETWORK

(71) Applicant: Corning Optical Communications LLC, Charlotte, NC (US)

(72) Inventors: Han-Ting Chiang, Menlo Park, CA (US); Brian Dunn, Menlo Park, CA (US); Hithesh Nama, Los Altos, CA (US); Krishna Sayana, Menlo Park, CA (US); Peter J. Worters, San Carlos, CA (US)

(73) Assignee: Corning Optical Communications LLC, Charlotte, NC (US)

( * ) Notice: Subject to any disclaimer, the term of this patent is extended or adjusted under 35 U.S.C. 154(b) by 169 days.

(21) Appl. No.: 16/036,214

(22) Filed: Jul. 16, 2018

(65) Prior Publication Data

US 2019/0123882 A1     Apr. 25, 2019

Related U.S. Application Data

(63) Continuation of application No. 14/075,516, filed on Nov. 8, 2013, now Pat. No. 10,097,329, which is a
(Continued)

(51) Int. Cl.
*H04L 5/00* (2006.01)
*H04L 1/00* (2006.01)
(Continued)

(52) U.S. Cl.
CPC .............. *H04L 5/0057* (2013.01); *H04L 1/00* (2013.01); *H04L 1/203* (2013.01); *H04L 5/0064* (2013.01);
(Continued)

(58) Field of Classification Search
CPC ......... H04L 5/0057; H04L 1/00; H04L 1/203; H04L 5/0064; H04L 5/0073;
(Continued)

(56) References Cited

U.S. PATENT DOCUMENTS 8,054,741 B2   11/2011  Song et al.
8,107,439 B2    1/2012  Yan et al.
(Continued)

FOREIGN PATENT DOCUMENTS

WO      2014100153 A1    6/2014

OTHER PUBLICATIONS

Ali et al; "Dynamic Frequency Allocation in Fractional Frequency Reused OFDMA Networks"; IEEE; (2008) pp. 1-6.
(Continued)

*Primary Examiner* — Kibrom T Hailu
(74) *Attorney, Agent, or Firm* — C. Keith Montgomery

(57) ABSTRACT

Arrangements disclosed here provide an LTE E-RAN employing a hierarchical architecture with a central controller controlling multiple LTE radio nodes (RNs). The RNs may be clustered within the small cell network. A fractional frequency reuse ("FFR") scheme is provided that dynamically computes the FFR allocations at individual RNs and configures the corresponding schedulers within each RN to improve cell-edge users' experience. Once an FFR pattern has been generated and frequencies allocated, UE throughput can be emulated to predict the resulting bit rates for each UE. Using the prediction, a scheduler emulation may be run to predict the behavior of the system. The results of each cell may then be collected to generate the performance of the entire system, which may in turn be used to generate a new or modified FFR pattern, or new or modified clustering. Optimization of the performance results in an optimized FFR pattern.

25 Claims, 23 Drawing Sheets

Related U.S. Application Data continuation of application No. 14/075,509, filed on Nov. 8, 2013, now Pat. No. 9,554,281.

(51) Int. Cl.
*H04W 72/04* (2009.01)
*H04L 1/20* (2006.01)
*H04W 28/06* (2009.01)
*H04W 72/12* (2009.01)

(52) U.S. Cl.
CPC .......... *H04L 5/0073* (2013.01); *H04L 5/0076* (2013.01); *H04W 72/04* (2013.01); *H04W 28/06* (2013.01); *H04W 72/0453* (2013.01); *H04W 72/1231* (2013.01)

(58) Field of Classification Search
CPC .... H04L 5/0076; H04W 16/10; H04W 72/04; H04W 28/04; H04W 28/06; H04W 72/0453; H04W 72/1231; H04W 72/08; H04W 16/02; H04W 72/082; H04W 16/04; H04W 52/244; H04W 84/045; H04W 52/241; H04W 52/283; H04W 36/0061; H04W 52/243; H04W 88/08; H04W 52/343; H04W 28/08; H04W 28/16; H04W 52/24; H04W 72/085; H04W 72/1226; H04W 16/06; H04W 72/12

See application file for complete search history.

(56) References Cited

U.S. PATENT DOCUMENTS

| | | |
|---|---|---|
| 8,391,876 B2 | 3/2013 | Gao et al. |
| 8,411,624 B2 | 4/2013 | Stolyar et al. |
| 8,521,173 B2 | 8/2013 | Zhang et al. |
| 8,559,961 B2 | 10/2013 | Boudreau et al. |
| 8,787,279 B2 | 7/2014 | Benjebbour et al. |
| 8,792,444 B2 | 7/2014 | Ishida et al. |
| 9,125,047 B2 | 9/2015 | Sundaresan et al. |
| 9,197,358 B2 | 11/2015 | Stapleton et al. |
| 9,554,281 B2 | 1/2017 | Chiang et al. |
| 9,769,766 B2 | 9/2017 | Hejazi et al. |
| 9,942,771 B2 | 4/2018 | Hejazi et al. |
| 10,097,329 B2 | 10/2018 | Chiang et al. |
| 2004/0117226 A1 | 6/2004 | Laiho et al. |
| 2006/0182065 A1 | 8/2006 | Petrovic et al. |
| 2007/0086406 A1 | 4/2007 | Papasakellariou |
| 2007/0177501 A1 | 8/2007 | Papasakellariou |
| 2008/0080465 A1 | 4/2008 | Pajukoski et al. |
| 2008/0189394 A1 | 8/2008 | Ross et al. |
| 2008/0205336 A1 | 8/2008 | Lee et al. |
| 2008/0274745 A1 | 11/2008 | Barak et al. |
| 2010/0062784 A1 | 3/2010 | Ornbo et al. |
| 2010/0087203 A1 | 4/2010 | Lee et al. |
| 2010/0142467 A1 | 6/2010 | Tiirola et al. |
| 2010/0197314 A1* | 8/2010 | Maaref ................. H04W 16/04 455/450 |
| 2010/0246542 A1 | 9/2010 | Orth |
| 2011/0003598 A1 | 1/2011 | Ma et al. |
| 2011/0045831 A1 | 2/2011 | Chiu et al. |
| 2011/0081865 A1 | 4/2011 | Xiao et al. |
| 2011/0263198 A1* | 10/2011 | Wu ..................... H04B 7/15542 455/7 |
| 2012/0122503 A1 | 5/2012 | Ma et al. |
| 2012/0157108 A1* | 6/2012 | Boudreau .............. H04J 11/005 455/450 |
| 2012/0157155 A1 | 6/2012 | Cho et al. |
| 2012/0322488 A1 | 12/2012 | Johansson et al. |
| 2013/0046889 A1 | 2/2013 | Tulin et al. |
| 2013/0115968 A1 | 5/2013 | Wegmann et al. |
| 2013/0196676 A1 | 8/2013 | Koudouridis et al. |
| 2013/0230010 A1 | 9/2013 | Kim et al. |
| 2013/0230028 A1* | 9/2013 | Calcev ................. H04L 1/0041 370/336 |
| 2013/0286954 A1 | 10/2013 | Ma et al. |
| 2013/0310060 A1 | 11/2013 | Boudreau et al. |
| 2014/0019619 A1 | 1/2014 | Senarath et al. |
| 2014/0031049 A1 | 1/2014 | Sundaresan et al. |
| 2014/0031050 A1* | 1/2014 | Boudreau ......... H04W 72/1231 455/452.1 |
| 2014/0169186 A1* | 6/2014 | Zhu .......................... H04L 5/00 370/252 |
| 2014/0269502 A1 | 9/2014 | Forenza et al. |
| 2014/0269642 A1 | 9/2014 | Forenza et al. |
| 2015/0080003 A1 | 3/2015 | Sadek et al. |
| 2015/0131537 A1 | 5/2015 | Chiang et al. |
| 2015/0133129 A1 | 5/2015 | Chiang et al. |
| 2015/0181465 A1 | 6/2015 | Dad et al. |
| 2015/0358836 A1 | 12/2015 | Zhu et al. |
| 2019/0033424 A1 | 1/2019 | Tee et al. |

OTHER PUBLICATIONS

Ali-Yahiya et al; "Zone Switching Diversity for Hierarchical Resource Allocation in Mobile WiMAX Networks"; IEEE Mobile WiMAX Symposium (2009) pp. 69-74.

Son et al; "Dynamic Association for Load Balancing and Interference Avoidance in Multi-Cell Networks"; IEEE; (Date Unknown) 23 Pages.

Ali-Yahiya et al; "Fractional Frequency Reuse in LTE Networks"; Understanding LTE and IS Performance, Chapter 12, pp. 199-210.

Fujii; "User Scheduling for Distributed-Antenna Zero-Forcing Beamforming Downlink Multiuser MIMO-OFDM Systems"; IEICE Trans. Commun., vol E93-B, No. 9; (2010); pp. 2370-2380.

Gang et al; "A Downlink Radio Resource Allocation Algorithm Based on Inter-Cell Interference Mitigation for Multi-Cell OFDMA System"; IEEE; (2006); 5 Pages.

Koutsimanis et al; "A Dynamic Resource Allocation Scheme for Guaranteed Bit Rate Services in OFDMA Networks"; IEEE; (2008); pp. 2524-2530.

Wan et al; "A Cross-Layer Packet Scheduling and Subchannel Allocation Scheme in 802.16E OFDMA System"; IEEE; (2007) pp. 1867-1872.

* cited by examiner

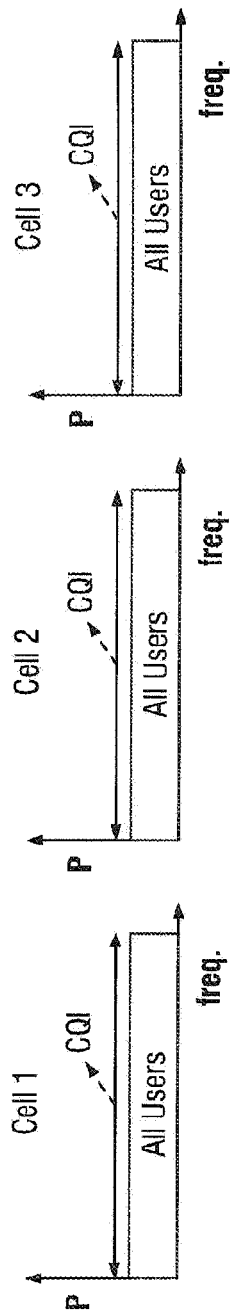
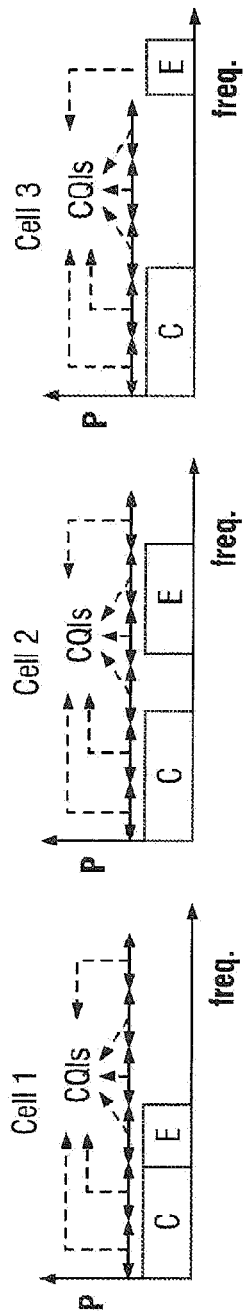
FIG. 3A
FIG. 3B

FIG. 6

Fig. : % of User Throughput < 1 Mbps!

| Scheme | %of User Throughput <1Mbps |
|---|---|
| WB | ~30% |
| SB-50SB | ~25% |
| FFR- UNI 10SB | ~15% |
| FFR-LD 25SB | ~10% |

FIG. 20

| Scheme | 5% Cell-Edge User Throughput (Mbps) | Gain over WB | Gain over SB |
|---|---|---|---|
| WB | 0.423 | | |
| SB-50SB | 0.524 | 24% | |
| FFR-UNI 10SB | 0.823 | 94% | 57% |
| FFR-LD 25SB | 1.154 | 174% | 120% |

FIG. 21

FRACTIONAL FREQUENCY REUSE SCHEMES ASSIGNED TO RADIO NODES IN AN LTE NETWORK

BACKGROUND

Operators of mobile systems, such as Universal Mobile Telecommunications Systems (UMTS) and its offspring including Long Term Evolution (LTE) and LTE-Advanced, are increasingly relying on wireless small cell radio access networks (RANs) in order to deploy indoor (as well as dense outdoor) voice and data services to enterprises and other customers. Such small cell RANs typically utilize multiple-access technologies capable of supporting communications with multiple users using radio frequency (RF) signals and sharing available system resources such as bandwidth and transmit power.

Deployment of a large number of small cells can improve system-wide capacity in an area by providing cell-splitting gains. However, these systems result in unique challenges to a RAN operator. Users at cell edges often suffer from inter-cell interference since the received signal power from the serving cell is at the same level or even below the level of the received aggregated interference power from the adjacent cells. If the inter-cell interference is not well-handled, the capacity benefits from the small cell deployments could come at the cost of reliability and the general stability of the system. Reliability and stability of a RAN are often captured by an extensive set of Key Performance Indicators (KPIs) that essentially characterize the user experience in such a network. Unlike the deployments of macro cell networks, the deployments of small cell are more irregular in geometry. The shapes and sizes of the coverage areas of small cells can vary greatly. In addition, the load distribution between small cells is more asymmetric when compared with that of macro cells, which cover much larger areas. These impose significant challenges for managing small cell inter-cell interference and require techniques to take all the irregularities in geometry and load distribution into consideration as part of the small cell network design. Specifically this means interference management schemes need to be designed differently. Some key focus areas for the design are i) scalability (can support large number of small cells) and ii) stability (autonomously account for different performance requirements/network conditions)

There are several approaches that may be used to reduce the influence of inter-cell interference. For example, one approach is to employ a frequency reuse pattern and by that, avoiding usage of the same frequency bands at adjacent cells. A drawback of this approach is that only a small fraction of the frequency resources (equal to the reuse factor) may be used in each cell, while preferably one would like to reuse a significant part of the whole available frequency spectrum within every cell. Another approach to improve the spectral efficiency in cellular systems is a "fractional frequency" approach, which divides the frequency resource into two parts or more. The first part is used for the edge of cell regions, while the second part is used for the regions closer to the radio node. The first part is used with a designated reuse factor, appropriate for the cell edges where users are more vulnerable to interference due to their reduced signal power. The second part (covering the inner part of the cell), however, can be used with a higher reuse factor because the Signal to Interference and Noise Ratio (SINR) is higher in this part of the cell in view of both the stronger desired signal and the larger distance from the interferers. An example of such approach, for example is to divide the available channels into 4 channels, three of which are used in a reuse-3 pattern for covering the cell edge regions, while the fourth channel is used in a reuse-1 manner for the inner regions of the cells.

Despite the use of the well-known aforementioned techniques for reducing inter-cell interference, additional improvements in cell-edge user performance are desirable, particularly when small cells are employed.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Systems and methods according to implementations of principles disclosed here provide an LTE E-RAN employing a hierarchical architecture with a central controller or coordinator controlling multiple LTE radio nodes (RNs). The central controller or coordinator may form a portion of a services node (SN) in communication with RNs that service user equipment or UEs. These RNs may be configured as individual cells (i.e, with different physical cell identities (PCIs)) within the small cell network. The systems and methods provide for a fractional frequency reuse ("FFR") scheme with a central controller that dynamically computes the FFR allocations at individual RNs and configures the corresponding individual MAC schedulers within each RN to improve cell-edge users' experience or more generally to meet well-defined KPIs for the system. The systems and methods operate in a manner that is scalable so that its performance gains are retained even for large system deployments.

In an exemplary method, the central controller may obtain topology information concerning the RNs. The central controller divides the RNs into two or more clusters of RNs based on their topology and generates a FFR pattern for each cluster. The SN then allocates transmission frequencies to the RNs in each cluster in accordance with the respective FFR pattern that is generated for each cluster. A transmission frequency could correspond to a sub-band, which is itself a set of resource blocks (RBs) as defined in 3GPP specifications TS 36.211, 36.212, 36.213.

Once an FFR pattern has been generated and frequencies allocated, the throughput of UEs can be emulated to predict the resulting bit rates for each UE. Using the resulting predicted bit rate, a scheduler emulation such as a proportional fairness (PF) scheduler emulation may be run to predict the behavior of the system, especially the performance metrics of UEs. The results of each cell may then be collected to generate the predicted KPIs of the entire system. If the predicted KPIs indicate that a modification is warranted, such may be instituted, e.g., a new or modified FFR pattern, or new or modified clustering, and a new set of KPIs predicted. Optimization of the KPIs results in an optimized FFR pattern. The emulation may be repeated periodically or continuously to ensure optimal resource allocation.

In general, various flavors of the schedulers may be used. A truly proportional fair scheduler adjusts the achievable predicted instantaneous rates to a user (or sometimes equivalently CQIs) by weights that capture the average rate achieved by that user so far. A round robin scheduler (RR) performs equal allocation to all the served users in a round robin fashion, i.e, one UE at a time in sequence. However, in real implementations, different users may be assigned different QOS parameters. A QOS parameter could include a guaranteed bit rate, a maximum bit rate, or a guaranteed maximum delay or delay distribution. Further each user may have multiple associated flows or radio bearers each with different QOS parameters. During operation, a scheduler can equivalently compute a certain weight associated with a user (or a traffic flow) which is a function of one or more of these channel, traffic and any other parameters. Some other parameters that are unique to a user or the RN could impose restrictions, for example, control channel capacity constraints etc., can be used in the weight computation. Essentially, a QOS scheduler may be defined, as a more general PF type scheduler, which computes generalized weights as mentioned and adjusts a predicted rate (or a KPI) metric to perform scheduling, i.e, selects users and resources for transmission.

In one aspect, the invention is directed towards a method of optimizing frequency allocation in a radio access network (RAN) that includes a plurality of RNs each associated with a cell and a SN operatively coupled to the RNs, the method including: dividing the RNs in the RAN into a plurality of clusters of RNs; generating a FFR pattern for each cluster; allocating transmission frequencies to the RNs in each cluster in accordance with the respective FFR pattern that is generated for each cluster; estimating bit rates of one or more user equipments (UEs) associated with each cell; performing a scheduling emulation within each cell using the estimated bit rates for the one or more UEs; and combining the results of the scheduling emulations for each cell to obtain a systemwide performance metric, and if the systemwide performance metric is less than a target threshold, then repeating one or more of the dividing, generating, allocating, estimating, performing, and combining steps, until the systemwide performance metric meets or exceeds the target threshold.

Implementations of the invention may include one or more of the following. The estimating bit rates may include calculating a SINR for each UE; and using a SINR-to-bit-rate map to determine the bit rate for each UE. The calculating a SINR may include using the geometry or topology of the UEs to calculate the SINR, including using the geometry of the clusters to calculate the SINR. The estimating bit rates may further include improving the estimation by using CQI data reported by the UE or by using measurement data on an uplink reference signal, such as where the measurement data includes a signal and subband specific interference measurement. The FFR pattern in the system-wide performance metric may refer to an uplink or a downlink transmission. The estimating and performing may be performed for each cell by a services node. The transmission frequencies may be frequencies used for uplink or downlink transmission. The systemwide performance metric may be selected from the group consisting of: cell packet throughput, 5% cell edge user throughput, user throughput CDP, call drop ratio, call setup success rate, radio link failure rate, and handover delay. A further step may include synchronizing the RNs, where the synchronizing includes synchronizing the control channels of the RNs, such as to within one OFDM symbol. Following the system-wide performance metric meeting or exceeding the target threshold, transmission frequencies may be allocated to the RNs in each cluster in accordance with the respective FFR pattern that resulted in the metric meeting or exceeding the target threshold, and a step may be performed of scheduling within each RN to allocate transmission frequencies to the UEs served by the RN, and the scheduling may direct cell edge users to high reuse bands and cell center users to low reuse bands. The scheduling step may be at least partially based on OE-specific information, including CQI, load, and QoS parameters. The systemwide performance metric may include the throughput of a cell edge user, and the repeating the generating step may include modifying the size of the center band until the throughput of the cell edge user meets or exceeds the threshold. The scheduling step may include PF scheduling, round-robin scheduling, or QOS based scheduling. The scheduling emulation may include PF scheduling emulation, round-robin scheduling emulation, or QOS based scheduling emulation.

In another aspect, the invention is directed towards a non-transitory computer readable medium, including instructions for causing a computing environment to perform the above method.

In another aspect, the invention is directed towards a radio node (RN) communicating with a plurality of user equipment (UE) in a radio access network, including: a processor; a first input for an FFR pattern; a second input for data about communications performance of a plurality of UEs associated with the RN; a scheduler module receiving data from the first and second inputs and configured to provide as output a scheduling of the plurality of UEs, such that the scheduler module is configured to direct a subset of the plurality of UEs corresponding to cell edge users to high reuse bands at least in part based on data from the second input, and further directs a subset of the plurality corresponding to cell center users to low reuse bands.

Implementations of the invention may include one or more of the following. The data from the second input may be selected from the group consisting of: CQI, load, and QoS parameters. The radio node may further include a synchronization module for receiving a signal from a SN, the signal for synchronizing the control channel of the RN. The FFR pattern may be based on a plurality of parameters, each selected for a different cluster of RNs within the radio access network. The scheduling module may be a PF scheduling module, a round-robin scheduling module, or a QOS based scheduling module.

In another aspect, the invention is directed towards a method of optimizing transmission resource allocation in a radio access network (RAN) that includes a plurality of radio nodes (RNs) each associated with a cell and a services node operatively coupled to the radio nodes, the method including: obtaining at least one system-wide performance metric representing operational performance of the RAN; if the system-wide performance metric is less than a target threshold, then adjusting a system-wide FFR pattern used to allocate transmission resources to the RNs until the system-wide performance metric meets or exceeds the target threshold, the system-wide FFR pattern including a plurality of cluster-based FFR patterns each being allocated to a different cluster of RNs, the RNs in the RAN being divided into a plurality of clusters.

Implementations of the invention may include one or more of the following. The adjusting the system-wide FFR pattern may include adjusting FFR scheme-related parameters used to generate the system-wide FFR pattern. The adjusting the system-wide FFR pattern may include adjusting one or more of the cluster-based FFR patterns by adjusting at least one operator-specified value selected from a plurality of parameters which are used as input data, where the plurality of parameters may include an FFR type specifying at least one criterion for allocating edge bands to the RNs in each cluster. The plurality of parameters may further include a number of frequency resource blocks assigned to a center band allocated to the RNs in each cluster for use by UEs in a cell interior of each cell. The plurality of parameters may further include a scheduling granularity of the center band specifying a number of frequency resource blocks assigned to the center band which are scheduled together. The plurality of parameters may further include a scheduling granularity of the edge band specifying a number of frequency resource blocks assigned to the edge band which are scheduled together. The FFR type may be selected from the group consisting of uniform FFR and load-based FFR, where uniform FFR allocates different edge bands of uniform size to each RN in a cluster and load-based FFR allocates to each RN in a cluster different edge bands having a size determined in part on load information obtained from the RNs in each cluster. The group may further consist of an FFR type in which a subset of RNs in a given cluster share edge bands. The load information may be selected from the group consisting of a load of each RN in a cluster, the number of active UEs served by each RN in a cluster, and DE-specific information, where the DE-specific information is selected from the group consisting of RSRP, load, QoS, sub-band channel quality indicators (CQIs), buffer status or latencies, and current or past KPIs maintained per RN or per UE. Adjusting the system-wide FFR pattern may include adjusting RN clustering parameters, wherein the RN clustering parameters may include a total number of clusters into which the RNs in the RAN are to be divided. The RN clustering parameters may include selection of a clustering algorithm used to divide the RNs into the plurality of clusters. The transmission resources may be resources used for uplink or downlink transmissions, or both. For at least one of the clusters, the cluster-based FFR pattern generated for uplink transmission may be the same as the cluster-based FFR pattern generated for downlink transmission. A cell associated with each RN may include a cell interior and a cell edge and, for at least one of the clusters, a size of the cell interior or cell edge associated with a given one of the RNs for purposes of uplink transmission is different from the size of the cell interior or cell edge associated with the given RN for purposes of downlink transmission. The systemwide performance metric may be selected from the group consisting of: cell packet throughput, 5% cell edge user throughput, and user throughput CDF, call drop ratio, call setup success ratio, radio link failure rate, and handover delay.

In another aspect, the invention is directed towards a non-transitory computer readable medium, including instructions for causing a computing environment to perform the above method.

In a further aspect, the invention is directed towards a services node controlling a plurality of radio nodes (RNs) in a radio access network (RAN), the plurality of radio nodes communicating with a plurality of user equipment (UE) in the radio access network, including: a processor; and a performance evaluation module operatively associated with the processor, the performance module having an input for obtaining at least one system-wide performance metric representing operational performance of the RAN, the performance evaluation module being configured such that if the system-wide performance metric is less than a target threshold, then adjusting a system-wide FFR pattern used to allocate transmission resources to the RNs until the system-wide performance metric meets or exceeds the target threshold, the system-wide FFR pattern including a plurality of cluster-based FFR patterns each being allocated to a different cluster of RNs, the RNs in the RAN being divided into a plurality of clusters.

In yet another aspect, the invention is directed towards a method for obtaining system performance metrics for a mobile communications system that includes a radio access network (RAN) having a plurality of radio nodes (RNs) each associated with a cell and services node operatively coupled to the RNs, including: obtaining an FFR pattern for the RAN; receiving from UEs operational in the cells a measurement of signal strength; based at least in part on the FFR pattern and the measurement of signal strength, emulating scheduling functionality performed by the RNs for allocating transmission resources to the UEs; based at least in part on the emulation, determining at least one performance metric for each of the cells in the RAN.

Implementations of the invention may include one or more of the following. The method may further include determining, for different levels of interference, an SINR for each of the UEs from the measurement of signal strength and the FFR pattern; and mapping each of the SINRs to a per-sub carrier bit rate, where emulating the scheduling functionality is performed using the per-subcarrier bit rates. The emulating the scheduling functionality may be performed by the RNs and the determining the at least one performance metric may be performed by the services node. The measurements of signal strength may include that of UE RSRPs. The at least one performance metric may be selected from the group consisting of a cell packet throughput, 5% cell-edge user throughput and a user throughput cumulative distribution function (CDF), call drop ratio, call setup success rate, radio link failure rate, and handover delay. The method may further include aggregating the at least one performance metric for each of the cells to obtain at least one predicted key performance indicator (KPT) for the mobile communications system. The method may further include receiving from the UEs, operational in the cells, channel quality information (CQI), where emulating the scheduling functionality performed by the RNs for allocating transmission resources to the UEs is also based at least in part on the CQI. The mapping may account for MIMO rank adaptation in which a number of transmission streams to the UEs adaptively changes according to a channel environment. The mapping may be derived by an empirical approximation of SNR to bit rate relationship using network operational data. The network operational data may include pairs of SNR and rate measurements at individual UEs collected system-wide for downlink transmissions. The network operational data may also include pairs of SNR and rate measurements at individual RNs corresponding to transmissions from different UEs collected system-wide for uplink transmissions. The FFR pattern for the RAN may be a system-wide FFR pattern that includes a plurality of FFR patterns that are each associated with a different subset of the RNs, each defining a cluster of RNs, where each cluster is selected such that interference between RNs within a cluster is greater than interference between RNs in different clusters. The transmission resources allocated to the UEs by the RNs may include frequency resource blocks and/or a transmission time interval. The scheduling functionality may employ a proportional fairness scheme, a round-robin scheduling scheme, or a QOS based scheduling scheme. The allocated transmission resources may be resources for uplink transmission or downlink transmission.

In yet another aspect, the invention is directed towards a non-transitory computer readable medium, including instructions for causing a computing environment to perform the above method.

In yet another aspect, the invention is directed towards a services node controlling a plurality of radio nodes (RNs) in a radio access network (RAN), the plurality of radio nodes communicating with a plurality of user equipment (UE) in the radio access network, including: a processor; a UE SINR calculator module operatively associated with the processor for determining, for different levels of interference, an SINR for each of the UEs from (i) a measurement of signal strength received from the UEs and/or (ii) a measurement of signal strength from the UEs measured on uplink reference signals and (iii) an FFR pattern used to allocate transmission frequencies to the RNs; an SJNR bit rate mapping module operatively associated with the processor for mapping each of the SINRs to a per-subcarrier bit rate; and a scheduler emulation module operatively associated with the processor for emulating scheduling functionality performed by each of the RNs for allocating transmission resources to the UEs based at least in part on the per-subcarrier bit rates.

Implementations of the invention may include one or more of the following. The SINRs and the FFR pattern may correspond to downlink or uplink transmission from RNs to the UEs. The measurements of signal strength may include UE RSRPs, and may further include measurement of received reference signal received power (RSRP) and interference power on uplink sounding reference signals (SRS) in LTE systems. The services node may further include a system performance metric prediction module for determining at least one performance metric for each of the cells in the RAN based at least in part on an output from the scheduler emulation module. The at least one performance metric may be selected from the group consisting of a cell packet throughput, 5% cell-edge user throughput and a user throughput cumulative distribution function (CDF). The system performance metric prediction module may be further configured to aggregate the at least one performance metric for each of the cells to obtain at least one predicted key performance indicator (KPI) for the mobile communications system. The scheduler emulation module may be further configured to emulate the scheduling functionality performed by the RNs for allocating transmission resources to the UEs using CQI received from the UEs. The SINR bit rate mapping module may be further configured to perform the mapping while accounting for MIMO rank adaptation in which a number of transmission streams to the UEs adaptively changes according to a channel environment. The FFR pattern for the RAN may be a system-wide FFR pattern that includes a plurality of FFR patterns that are each associated with a different subset of the RNs, each defining a cluster of RNs, where each cluster is selected such that interference between RNs within a cluster is greater than interference between RNs in different clusters. The transmission resources allocated to the UEs by the RNs may include frequency resource blocks and/or a transmission time interval. The scheduler emulation module may employ a proportional fairness scheme, a round-robin scheduling scheme or a QOS based scheduling scheme.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 3A and 3B illustrate exemplary FFR schemes that use non-overlapping RBs for cell-edge UEs of adjacent eNBs. FIG. 3A illustrates an allocation of frequencies in a frequency reuse one scheme, where all frequencies have a frequency reuse one scheme. FIG. 3B shows an exemplary FFR scheme that allocates dedicated frequency bands (edge bands) for each cell to create interference free or less-interfered bands for cell-edge users.

FIG. 6 illustrates various exemplary types of FFR schemes according to present principles;

FIG. 7 is a flowchart illustrating one exemplary method for establishing a mobile communications network that includes a small cell RAN controlled by a SN in an environment such as a building, residence or the like.

FIGS. 18-21 illustrates various KPis which may be employed for optimization, further indicating performance improvement in systems employing FFR.

FIG. 22A illustrates sub-band partitioning without FFR, and FIG. 22B illustrates sub-band partitioning with FFR according to present principles.

Like reference numerals indicate like elements in the drawings. Elements are not drawn to scale unless otherwise indicated.

DETAILED DESCRIPTION

Figure 1:
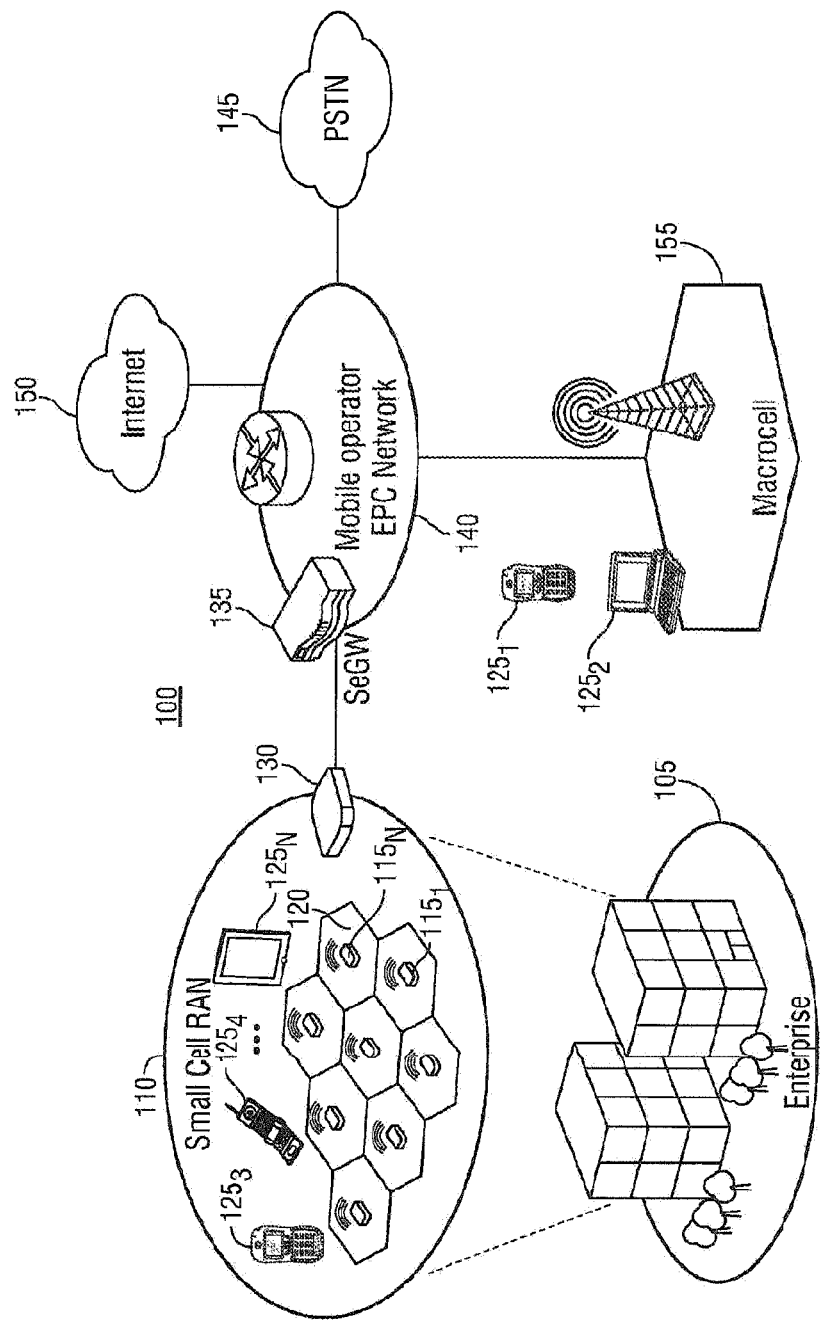
FIG. 1 shows an illustrative mobile telecommunications environment in which the present LTE FFR improvement may be practiced.

FIG. 1 shows an illustrative mobile telecommunications environment 100 in which the present invention may be practiced. The mobile telecommunications environment 100, in this illustrative example, is arranged as an LTE system as described by the Third Generation Partnership Project (3GPP) as an evolution of the GSM/UMTS standards (Global System for Mobile communication/UMTS). It is emphasized, however, that the present principles described herein may also be applicable to other network types and protocols. For example, other network types and protocols that may be employed include, without limitation HSPA, LTE, CDMA2000, GSM, IEEE 802.11/Wi-Fi, 802.16 etc. or a mixture of technologies such as with a multi-standard radio (MSR) node (e.g., LTE/HSPA, GSM/HS/LTE, CDMA2000/LTE, etc).

The environment 100 includes an enterprise 105 in which a small cell RAN 110 is implemented. The small cell RAN 110 includes a plurality of RNs 1151 ... 115$_N$. Each RN 115 has a radio coverage area (graphically depicted in the drawings as a hexagonal shape) that is commonly termed a small cell. A small cell may also be referred to as a femtocell, or using terminology defined by 3GPP as a Home Evolved Node B (HeNB). In the description that follows, the term "cell" typically means the combination of a RN and its radio coverage area unless otherwise indicated. A representative cell is indicated by reference numeral 120 in FIG. 1.

The size of the enterprise 105 and the number of cells deployed in the small cell RAN 110 may vary. In typical implementations, the enterprise 105 can be from 50,000 to 500,000 square feet and encompass multiple floors and the small cell RAN 110 may support hundreds to thousands of users using mobile communication platforms such as mobile phones, smartphones, tablet computing devices, and the like (referred to as "user equipment" (UE) and indicated by reference numerals 1251-N in FIG. 1). However, the foregoing is intended to be illustrative and the solutions described herein can be typically expected to be readily scalable either upwards or downwards as the needs of a particular usage scenario demand.

In this particular illustrative example, the small cell RAN 110 includes one or more SNs (represented as a single SN 130 in FIG. 1) that manage and control the RNs 115. In alternative implementations, the management and control functionality may be incorporated into a RN, distributed among nodes, or implemented remotely (i.e., using infrastructure external to the small cell RAN 110). The RNs 115 are coupled to the SN 130 over a direct or local area network (LAN) connection (not shown in FIG. 1) typically using secure IPsec tunnels. In alternative implementations, the connection between the RNs 115 and SN 130 may be over a wireless link or wireless local area network (W-LAN) connection (not shown in FIG. 1). The SN 130 aggregates voice and data traffic from the RNs 115 and provides connectivity over an IPsec tunnel to a security gateway SeGW 135 in an Evolved Packet Core (EPC) 140 network of a mobile operator. The EPC 140 is typically configured to communicate with a public switched telephone network (PSTN) 145 to carry circuit-switched traffic, as well as for communicating with an external packet-switched network such as the Internet 150.

The environment 100 also generally includes Evolved Node B (eNB) base stations, or "macro cells", as representatively indicated by reference numeral 155 in FIG. 1. The radio coverage area of the macro cell 155 is typically much larger than that of a small cell where the extent of coverage often depends on the base station configuration and surrounding geography. Thus, a given UE 125 may achieve connectivity to the network 140 through either a macro cell or small cell in the environment 100.

Figure 2:
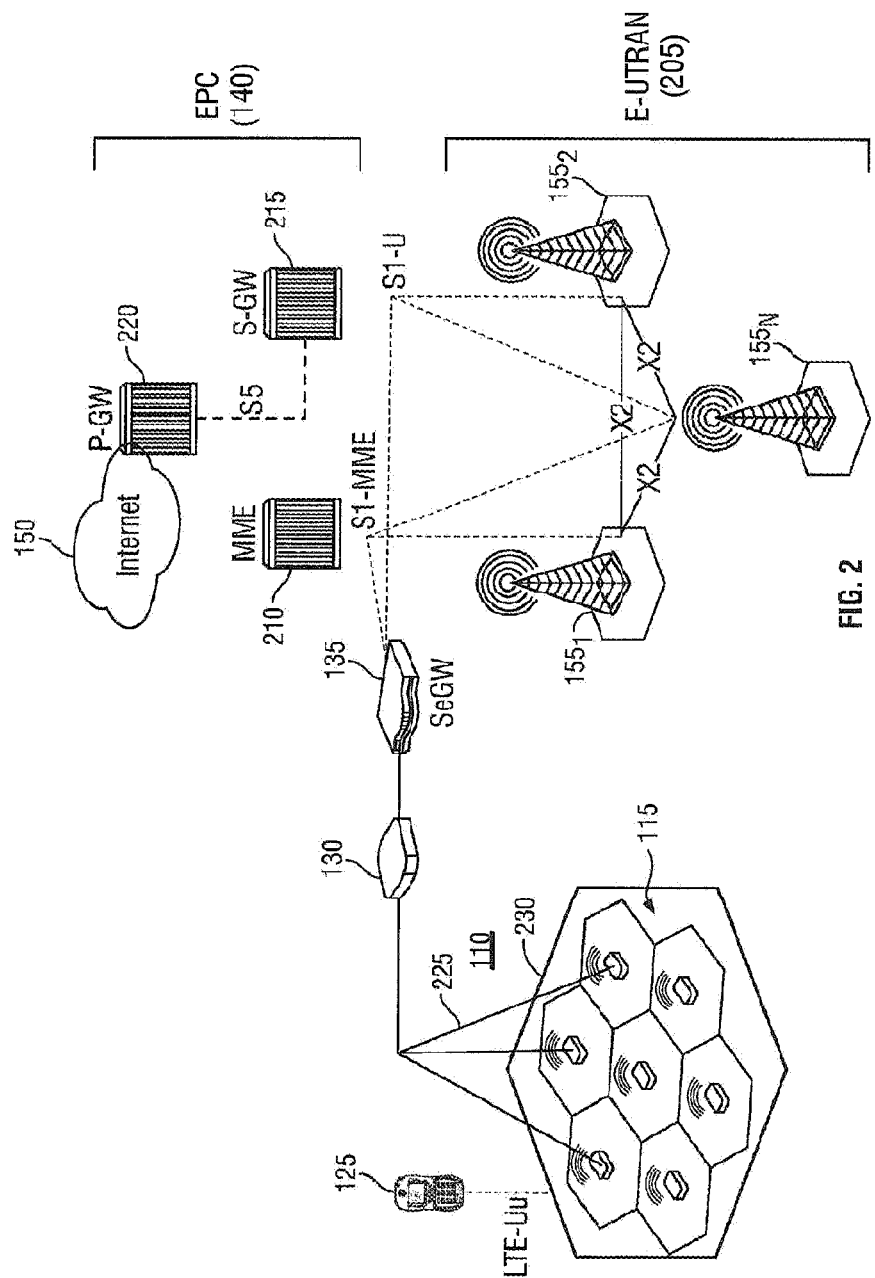
FIG. 2 shows details of an EPC (Evolved Packet Core) and E-UTRAN (Evolved UMTS Terrestrial Radio Access Network where UMTS is an acronym for Universal Mobile Telecommunications System) arranged under LTE with which a small cell network may interoperate.

Along with macro cells 155, the small cell RAN 110 forms an access network, i.e., an Evolved UMTS Terrestrial Radio Access Network (E-UTRAN) under 3GPP as represented by reference numeral 205 in FIG. 2. As shown, there is no standards defined centralized controller (similar to a Radio Network Controller (RNC) in UMTS/UTRAN) in the E-UTRAN 205, hence an LTE network architecture is commonly said to be "flat." The macro cells 155 are typically interconnected using an X2 interface and to the EPC 140 by means of an SI interface. More particularly, the macro cells are connected to the MME (Mobility Management Entity) 210 in the EPC 140 using an S1-MME interface and to the S-GW (Serving Gateway) 215 using an S1-U interface. An SS interface couples the S-GW 215 to a P-GW (Packet Data Network Gateway) 220 in the EPC 140 to provide the UE 125 with connectivity to the Internet 150. A UE 125 connects to the KNs 115 over an LTE-Uu interface.

The SeGW 135 is also connected to the MME 210 and S-GW 215 in the EPC 140 using the appropriate S 1 connections. Accordingly, as each of RNs 115 in the small cell RAN 110 is operatively coupled to the SN 130 (as representatively shown by lines 225), the connections from the RNs 115 to the EPC 140 are aggregated to the EPC 140. Such aggregation preserves the flat characteristics of the LTE network while reducing the number of S1 connections that would otherwise be presented to the EPC 140. The small cell RAN 110 thus essentially appears a single eNB 230 to the EPC 140, as shown.

The LTE air interface uses Orthogonal Frequency Division Multiplexing (OFDM) for enhanced throughput and spectral efficiency. The air interface has a Transmission Time Interval (TTI) of 1 ms (also referred to as a subframe) along with other features to lower latency. The primary element used in scheduling transmissions is a RB, and RBs make up subframes which in turn make up radio frames. Each subframe includes both control regions and data regions that are multiplexed in time-domain, in frequency domain, or in both time and frequency domains. In one method, FFR schemes are used over the data part (referred to as POSCH and PUSCH region in LTE) of the subframe, where the available resource can be divided into multiple sub-bands over the whole bandwidth.

One of the most significant issues in a multi-cell deployment is the performance of user equipment at cell edge. For example, a UE at a cell edge experiences significant interference from the downlink transmissions of adjacent eNBs in decoding the downlink transmissions from its own serving cell. As a result, the cell-edge spectral efficiency is significantly poorer than that in the interior of the cell. The LTE standard has introduced several coordination mechanisms to improve cell-edge performance.

In one such mechanism, a FFR scheme, uses non-overlapping RBs for cell-edge UEs of adjacent eNBs as illustrated in FIGS. 3a and 3b. In FIG. 3a all frequencies have a frequency reuse one scheme. The FFR scheme in FIG. 3b allocates dedicated frequency bands (edge bands) for each cell to create interference free or less-interfered frequency bands for cell-edge users. It also manages to maintain the average system performance by using a common center band (with a frequency reuse factor of one) for cell-center users. The FFR scheme can be viewed as a combination of the frequency reuse one scheme with higher (>1) frequency reuse factor schemes. As shown in FIG. 3b, the less interfered center users of all cells utilize the same frequency (center band) while the heavily interfered edge users in different cells are directed to non overlapped dedicated frequency bands (edge band) to create separation with each other. The scheduling decision is made based on DE-specific information such as sub-band Channel Quality Information (CQI), load, and Quality of Service (QoS). The FFR scheme described below is scalable and has the ability to autonomously optimize and select the desired FFR pattern for each RN depending on the various performance targets, e.g., KPIs that are employed.

The FFR scheme described herein may be employed with a central coordinating entity, e.g., hosted on a SN, that dynamically computes the FFR allocation and accordingly configures the individual MAC schedulers within each RN. Use of a central coordinating entity provides a number of benefits, in particular, frequency allocations can be calculated much more efficiently and rapidly as opposed to distributed algorithms in which a mesh of eNBs would exchange messages and generally take much greater computational time to converge to a global optimal solution.

In the centrally coordinated FFR scheme described herein the SN is able to collect information and measurements from the RNs and act on it at the same time. The information may include the topology of the RNs, the geometry of individual UEs, the distance between UEs and each RN, the number of UEs served by individual RNs, the load of the UEs and RNs, and QoS requirements of the UEs. The topology of the RNs and the geometry of the UEs may be obtained from measurements of signal strength (e.g. RSRP in LTE, CPICH RSCP in HSPA, GSM BCCH RSSI, CDMA2000 1×RTT Pilot Strength, CDMA2000 HRPD Pilot Strength etc) at the RNs (RN sniffing) and UEs respectively. Here topology specifically refers to RN-RN pairwise metrics, whereas geometry refers to UE to RN pair-wise metrics, and RSRP or RF pathless are examples.

The centrally coordinated FFR scheme employs two primary processes:

1. A RN scheduling process, which runs at each RN.
2. An FFR pattern generation process, which runs at the SN.

The FFR pattern generation process performed by the SN will be discussed first, in FIGS. 4-11. This is followed by a discussion of using the generated FFR pattern in a PF scheduler emulation with appropriate feedback to determine the optimized clustering and FFR pattern, given desired KPI metrics, as well as RN scheduling, in FIGS. 12-23.

FFR pattern generation modules may take into account the behavior of the RN scheduling process in some of the methods. An FFR pattern at a RN may be defined essentially as i) the set of sub-bands (or transmission frequencies) that it is allowed to transmit on and ii) the set of frequencies that it is precluded from transmission. More generally, an FFR pattern could describe the power constraints/restrictions on one or more sub-bands. The methods described herein can be adapted to this more general definition. In practice, many of the benefits can be obtained from using either a full power or zero power transmission in individual sub-bands. Accordingly, for purposes of illustration only and not as a limitation on the subject matter disclosed herein the following discussion will focus on FFR patterns that operate in this binary manner.

The set of frequencies in which transmission is allowed and the set of frequencies in which transmission is precluded may change each subframe according to a time-domain pattern, in which case the FFR pattern specifies both frequencies and subframes in which transmission is allowed or precluded. The time-domain pattern may be generated such that cell edge resources can be shared closer to a desired ratio. Alternatively, the time-domain pattern may reflect constraints imposed by neighboring macro cells.

Figure 4:
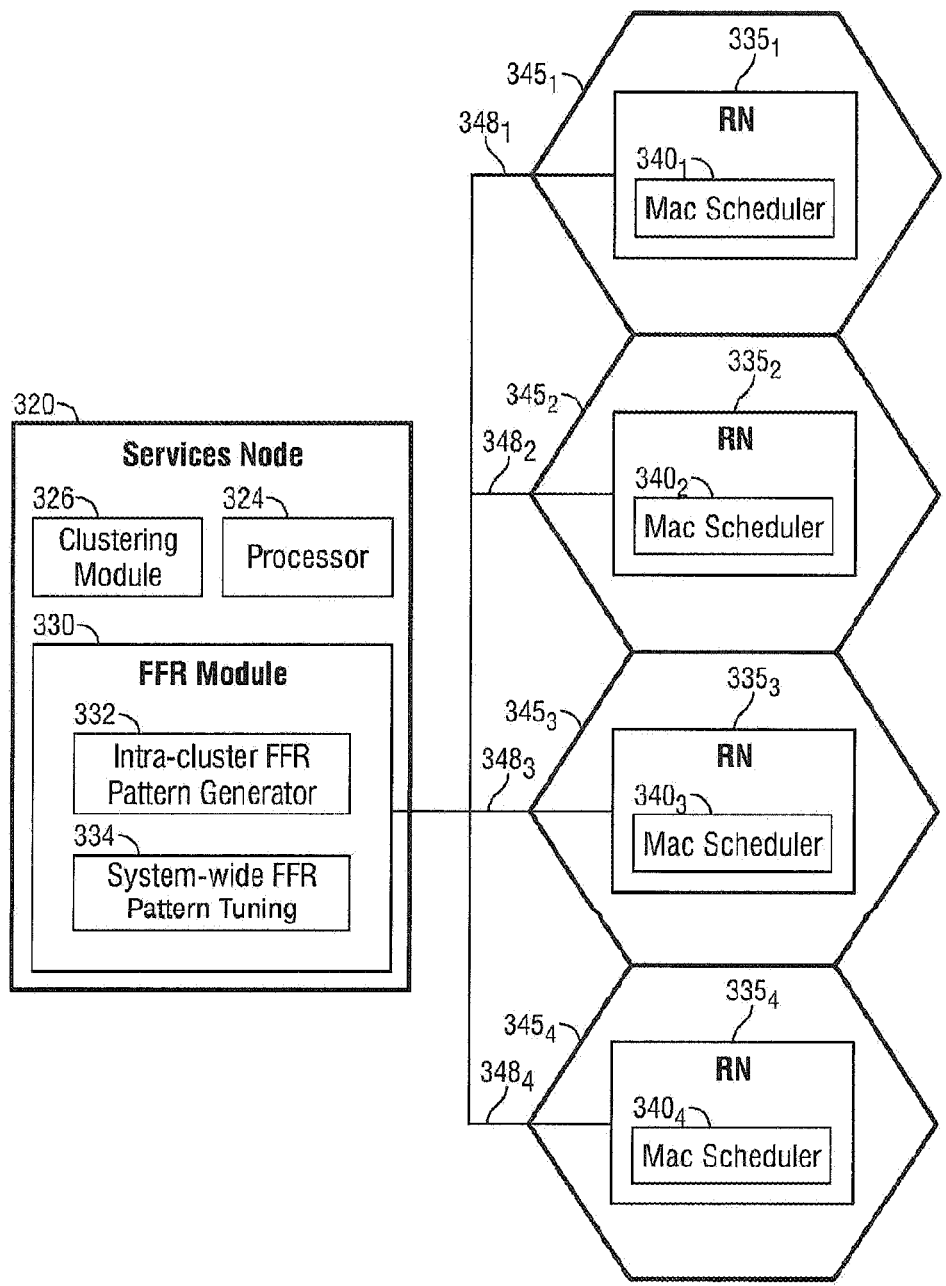
FIG. 4 illustratively shows a simplified functional block diagram of illustrative hardware infrastructure for a SN, as well as illustrative RNs, which may be utilized to implement the present principles.

Referring now to the schematic layout of FIG. 4, an exemplary SN 320 is illustrated in radio communication with a number of cells $345_1$-$345_4$. Each cell $345_i$ includes a RN $335_i$, within. Each RN $335_i$, includes at least one MAC scheduler $340_i$. The MAC scheduler $340_i$, is responsible for scheduling transmissions in both the uplink and downlink: directions for the UEs it serves.

The SN 320 includes a processor 324 and a number of modules to carry out its desired functionality, including a clustering module 326 and an FFR module 330.

The clustering module 326 partitions the RNs controlled by the SN into multiple clusters of RNs using the topology of the RNs as input. In one implementation an approximately fixed number of RNs is targeted per cluster. The FFR process involves the selection of the center band region and an edge band region that is common across all clusters (and the corresponding RNs). Within each cluster, FFR patterns are further allocated to the RNs, where the SN allocates the available edge bands to individual RNs. Use of a clustering approach can completely eliminate intra-cluster interference and significantly reduce the inter-cluster interference on the edge band regions.

The parameters which are used as inputs into the clustering module 326 include the designated numbers of clusters and the cluster size. Each cluster represents an interference group such that the RNs within the same cluster interfere with each other more strongly than with RNs in other clusters. Such a definition of the interference relationship may be expressed in an average sense. For example, an intra-cluster distance metric may be minimized and inter-cluster distance metric may be maximized for this purpose. Similar metrics related to absolute distance based topology (ex: using X,Y,Z coordinates) or RF topology (pathloss or RSRPs between nodes) can also be used.

Figure 5:
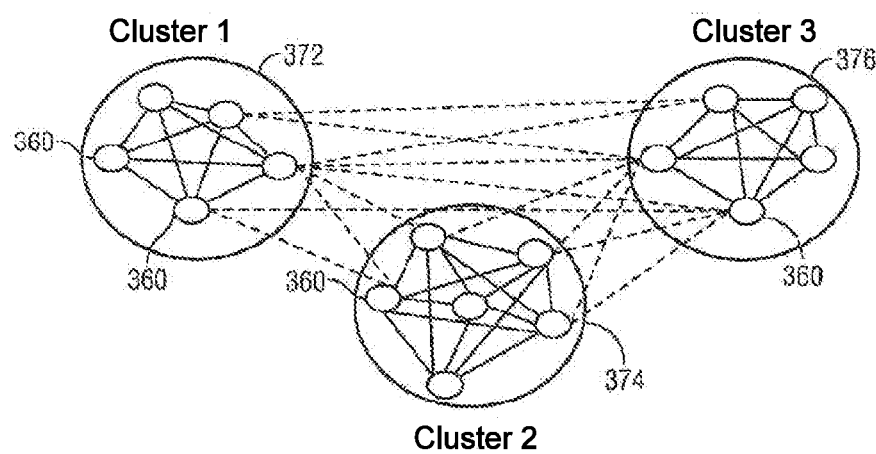
FIG. 5 illustrates a set of RN s in a RAN which is divided into three clusters.

An example in which a set of RNs 360 associated with a common SN is arranged into three clusters 372, 374 and 376 is shown in FIG. 5. The solid lines between nodes indicate strong interference and dashed lines indicates weak interference. Interference between RNs that are not connected by either a solid or dashed line is negligible.

Along with values for the parameter inputs of cluster size and the number of clusters, the inputs to the clustering module 326 include the information containing the topology of RNs as described, which can be expressed in terms of their explicit positions (e.g., GPS type X, Y location+ floor information) and/or a relative metric such as pair-wise RSRPs (i.e., topology) between RNs in an LTE system.

Hierarchical clustering algorithms, for example, "Group Average Agglomerative Hierarchical Clustering" and "Ward's Agglomerative Hierarchical Clustering", may be used to group RNs when only pair-wise RSRP or path-loss values between RNs are available (i.e., the topology information that is available when the network is booted and a neighbor scan is completed). Other methods like "K-means" and "C-means fuzzy clustering" can be employed when the absolute metrics like RNs positions/locations are available. The use of such clustering techniques can facilitate the FFR scheme's ability to scale up to accommodate a large number of RNs robustly and effectively. This is achieved by using a hierarchical approach to FFR pattern design using clustering as will be further described.

After the RN s have been arranged into clusters, the intra-cluster FFR pattern generator 332 in the FFR module 330 generates various FFR patterns for each cluster. The patterns are generated based on information obtained from the RNs within each cluster and values for various parameters that are input to the intra-cluster FFR pattern generator 332. Such parameters which may be specified include the FFR type, the size of the center band, the scheduling granularity of the center band and the scheduling granularity of the edge band. The FFR type specifies the criterion to be used for allocating the edge bands to the RNs in each cluster. Illustrative FFR types that may be employed will be discussed below. The size of the center band specifies the number of frequency RBs contained in the center band. The scheduling granularity of the center band divides the RBs in the center band into RB groups which are to be scheduled together. RB groups may correspond to a sub-band or transmission frequency as described earlier, and may comprise a set of contiguous or non-contiguous RBs. The size of the RB group depends on the granularity that is chosen. Likewise, the scheduling granularity of the edge band divides the RBs in the edge bands into RB groups which are to be scheduled together. The intra-cluster FFR pattern generator 332 has the flexibility of generating FFR patterns using different methods, which may be selected by the particular information obtained from the RNs within each cluster and the values for the aforementioned parameters, when available.

The types of FFR schemes that may be employed can be broadly divided into two categories: uniform FFR and load-based FFR.

In uniform FFR, the edge bands are uniformly distributed among the RNs in a cluster. In other words, each RN is allocated edge bands having the same size. This scheme requires minimal information from the RNs.

In a variation of the above method, a fixed FFR scheme may be used which similarly does not rely on information from the RNs. However, the allocation of the edge bands need not be uniform. The fixed sizes within each RN are determined based primarily on the topology i.e., RF environment and any known/expected RN usage. As an example, for RNs that are known to be at the edge of the network and hence are needed to support ingress and egress of users, preferentially more edge bands may be assigned. As another example, for RNs that are known to be in locations where higher user density is expected (like conference rooms indoors), preferentially higher number of sub-bands may be assigned.

In load-based FFR, the size of the edge band that is allocated to each RN is adjusted according to the load information collected from the RNs. The load information could be one or more of the load of the RN, the number of active UEs served by the RN, and UE-specific information such as RSRP, load, QoS requirements, and sub-band channel quality indicators (CQIs), for example. They could also include information like buffer status or latencies or current or past KPJs maintained per RN or per UE. In one illustrative load-based FFR scheme, the edge band is allocated with a size in proportion to the number of active UEs associated with each RN. Another example is to allocate the edge band in proportion to the total expected aggregate data rate across the QoS bearers of the UE. A configurable weighted priority can also be used. Moreover, it is also possible that RNs having very few users, i.e., RNs which are lightly loaded, may not be allocated any edge bands. In one method, a particular traffic or usage or application type may be prioritized. As an example, a number of voice users at each RN may be used for deriving the FFR patterns.

Figure 6:
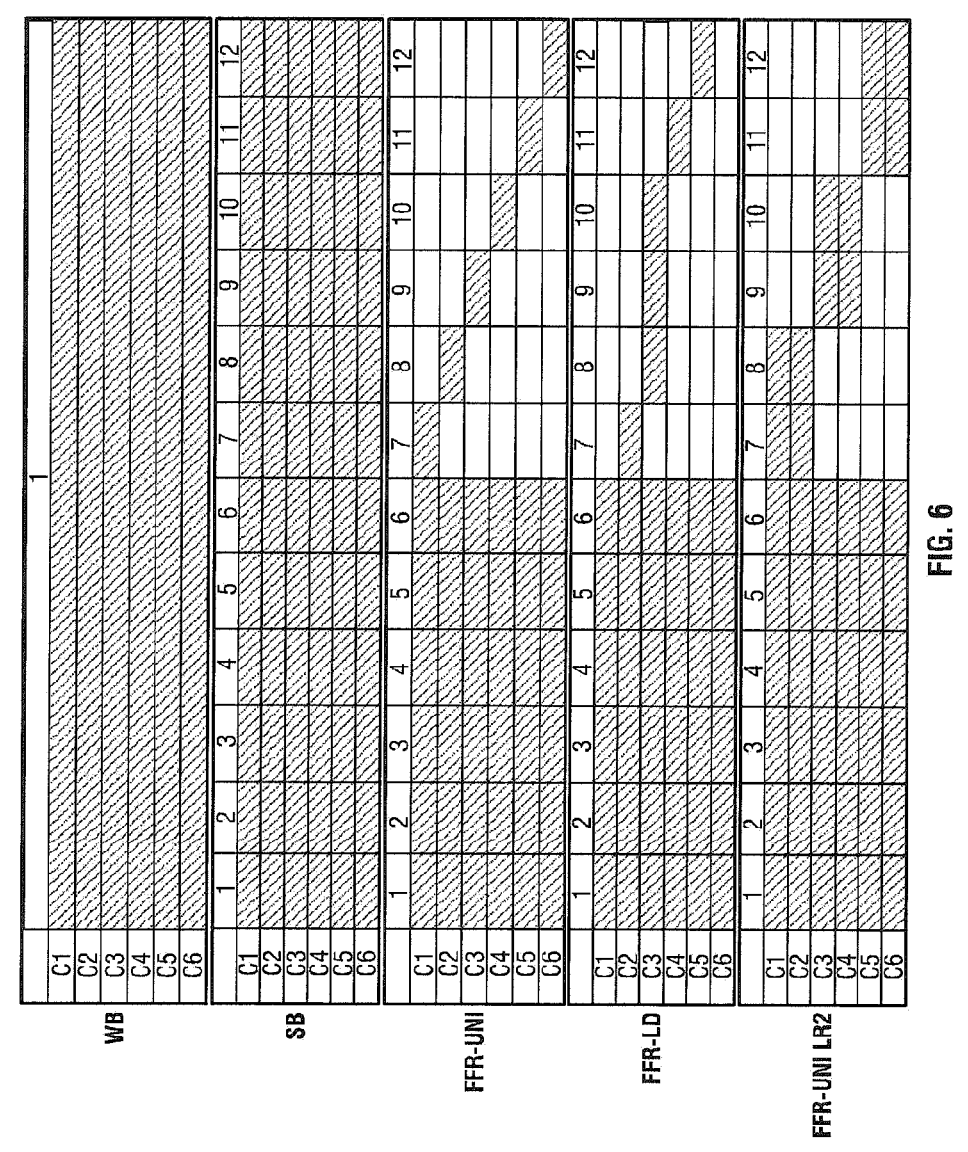

FIG. 6 illustrates some examples of different types of frequency allocation schemes that may be employed. Each scheme is shown for a cluster of 6 RNs denoted C1-C6. The frequency band is divided into twelve sub-bands, which are shown along the rows for each RN in a given scheme. Shaded sub-bands indicate sub-bands that are allocated for use by their respective RNs and unshaded sub-bands indicate sub-bands that are not allocated for use by their respective RNs. In this way the corresponding sub-band allocations for each scheme are illustrated.

The first two schemes, wide-band (WB) and sub-band (SB), are frequency allocation schemes that do not employ FFR and are described as a reference mode of operation. In particular, in the WB scheme frequency selective diversity is not exploited among the UEs and the RNs in every cell occupy the entire available bandwidth and schedule UEs in a frequency agnostic way. In other words, they do not exploit the sub-band/frequency specific channel quality. Also, only a single UE is typically assigned a given transmission time interval (TTI). In the SB scheme, the frequency resources are allocated on a sub-band basis to exploit frequency selective diversity and multiple UEs are assigned a given TTI. The second scheme improves performance of the system over the WB schemes in a rich multipath environment.

The final three frequency allocation schemes shown in FIG. 6, FFR with uniform allocation (FFR-UNI), load-based FFR (FFR-LD) and FFR UNI with 2 RNs sharing an edge band (FFR-UNI LR2), are all FFR schemes.

The FFR-UNI and FFR-LD schemes respectively correspond to the uniform PFR and load-based PPR schemes discussed above. As shown, in the PPR-UNI scheme each RN is assigned a single, dedicated edge sub-band. Likewise, in the FPR-LD scheme different RNs are assigned a different number of edge sub-bands, based on their respective loads. That is, the RNs are each allocated a total edge band that does not overlap with other edge bands in the cluster, but the size of each total edge band may be different from RN to RN. In this example, for instance, RNs C2, C4 and C5 are each allocated a single edge sub-band, whereas RN C3 is allocated three edge sub-bands.

The final PFR scheme shown in FIG. 6, FFR-UNI LR2, is an example of a scheme that may be used with either a uniform or a load-based FFR scheme. In this scheme multiple RNs (but not all the RNs in the same cluster) can share edge bands instead of allocating a dedicated edge band to each RN. In this case the reuse ratio (which otherwise is equal to the number of RNs in the cluster) is lowered. RNs within the same cluster can be chosen, for example, to share an edge band based on their interference topology. The RNs in a cluster that interfere less with each other, such as those RNs that receive low RSRPs from one another, may be selected to share the same edge band. In the example shown in FIG. 6 RNs CI and C2 share a common edge band (comprising two edge sub-bands), RNs C3 and C4 share a common edge band (comprising two edge sub-bands) and RNs C5 and C6 share a common edge band (comprising two edge sub-bands). This specific variation of FFR scheme may be used to improve the effective reuse ratio of FFR and hence the system performance. In one method, this scheme can be generalized to allow sharing of a different number of RNs (instead of a fixed value like 2) in each sub-band.

To avoid accumulating interference on the edge bands allocated to RNs in different clusters, the center bands of the FFR patterns of the clusters may all be aligned with one another. In other words, for all clusters assigned to a given SN, the center bands may share the same frequency bands and have the same size. However, in some cases there may be a need for flexibility to support different center band sizes in different clusters if there are significant differences in cluster traffic patterns or RF conditions. In these cases, the algorithm will then assign the center sub-bands such that there is as much alignment as possible, i.e., alignment may not be applied in a strict sense. For example if M1, M2, M3 are center bands for clusters C1, C2, C3, then the assignment of these sub-bands is such that M1 ⊂ M2 ⊂ M3. It is clear that in this case, sub-bands in cluster 1 that are in M3, but are not in M1 may be used as edge bands within cluster I (increasing edge region in C1), but may not receive as much protection from inter-cluster interference.

Referring again to FIG. 4, the system-wide FFR pattern tuning module 334 of the FFR module 330 combines the FFR pattern of the individual clusters into a system-wide FFR pattern. Such combination methods do not further change the size of the center/edge sub-bands within each cluster, but may readjust them to further improve SNR in the edge bands by aligning edge bands of RNs from different clusters. To elaborate, the RNs in different clusters share edge bands as a result of the intra-cluster FFR patterns that have been assigned to them by the intra-cluster FFR pattern generator 332. As a result inter-cluster edge-band interference may arise, though intra-cluster interference is eliminated. The system-wide FFR pattern module 334 further adjusts or tunes the FFR pattern of certain example clusters to reduce this interference. For example, a selected RN, RN1, in cluster 1 may be assigned an edge band on which RN1 observes the lowest interference from other clusters. Note that this step can be performed in several different ways. In one method, a sequential approach can be used, for example, starting from a first cluster where RNs can be arbitrarily assigned, and then moving on to second cluster and assigning RNs in each sub-band such that interference from cluster 1 is minimized, and so on. In another method, a joint optimization approach can be used, where a certain KPI can be maximized over the possible assignments. An example of the KPI could be the sum rate over the clusters and over the edge bands. Another example could be maximizing the minimum rate.

A given system-wide FFR pattern generated by the FFR module 330 may be updated at a rate that may depend on a variety of factors including, for example, the rate at which channel conditions change, load variations and the long term topology between cells. The dynamics of variations in the system-wide FPR pattern can be determined according to the additional gains that are realized. Tradeoffs in performance and complexity are factors that may be used to determine the update frequency. For example, the signaling load on the links between the SN and the RNs may be taken into account when determining a suitable update frequency.

An update to the PFR pattern generation may also be triggered by additional events that arise from changes in the network. Examples of such changes could include failure of one or more RNs, i.e, RN no longer able to transmit and serve UEs, bring-up of an RN, i.e., adding the same to the network, and so on. In case of such a network event, some or all of the modules of the FFR algorithm may be affected. In one method, clustering may be performed simply deleting the RN from the corresponding cluster or adding a new RN to the 'closest' cluster, where the closeness is defined based on a pairwise distance metric, e.g., RSRP, RF Pathloss, etc., as defined earlier. Further FFR patterns may be reassigned within the corresponding cluster.

Figure 7:
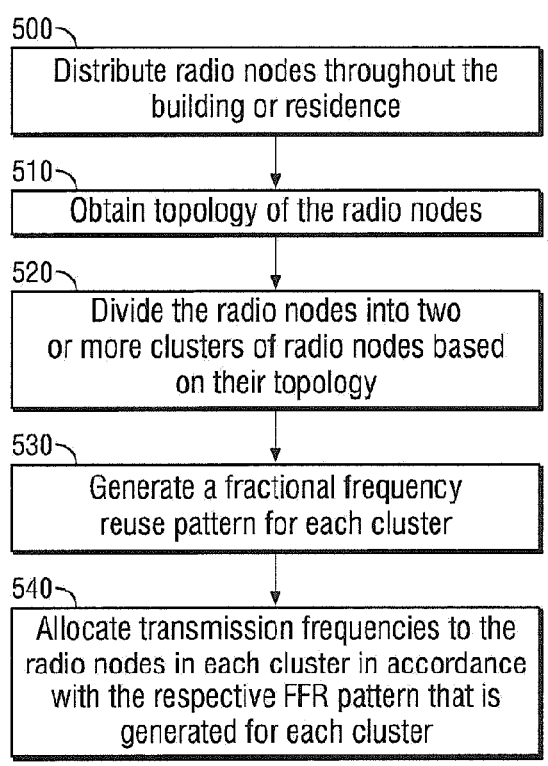

FIG. 7 is flowchart illustrating one exemplary method for establishing a mobile communications network that includes a small cell RAN controlled by a SN in an environment such as a building, residence or the like. The method begins at block 500 when a series of RNs are distributed throughout the environment. At block 510 the SN obtains topology information of the RNs. At block 520 the SN divides the RNs into two or more of clusters of RNs based on their topology. Next, at block 530 the SN generates a FFR pattern for each cluster and finally, at block 540 the SN allocates transmission frequencies to the RNs each cluster in accordance with the respective FFR pattern that is generated for each cluster.

The same sequence of operations described above for downlink transmission also can be used to assign uplink frequencies for use by each cell. In this case cell center and cell edge frequencies are those used for transmission by UE and reception by one or more RNs in the RAN. In general, the assignment of cells to clusters and the FFR pattern for each cell may be different for uplink and downlink transmission. The size of the cell center and cell edge region for uplink may differ from downlink to allow for a different tradeoff between cell edge coverage and cell center throughput.

For load-based FFR, different uplink and downlink load and QoS requirements can be accommodated for by assigning different FFR patterns for uplink and downlink. Alternatively, identical FFR patterns can be assigned for uplink and downlink transmission on the same cell to reduce signaling load or to allow for more frequent FFR pattern updates for the same signaling load. In this case a combined uplink and downlink load metric is used for FFR pattern generation. For example, a weighted sum of uplink and downlink load.

Scheduling granularity may differ on uplink and downlink, and it may not be possible to schedule the same set of frequencies on uplink and downlink. For example, uplink cell edge resources can be allocated as a contiguous set of RBs to accommodate a single-carrier uplink physical layer such as in LTE. On the downlink, cell edge resources can be allocated to align with the sub-bands used for UE sub-band CQI reporting.

For both uplink and downlink, cell edge interference represents the degree to which clusters are separated from each other and is a measure of the quality of the clustering assignment. Each cell can keep track of the inter-cluster (cell edge) interference level and send periodic reports to the SN. The clustering algorithm can then use these measurements to select from possible clustering assignments.

Example

Figure 8:
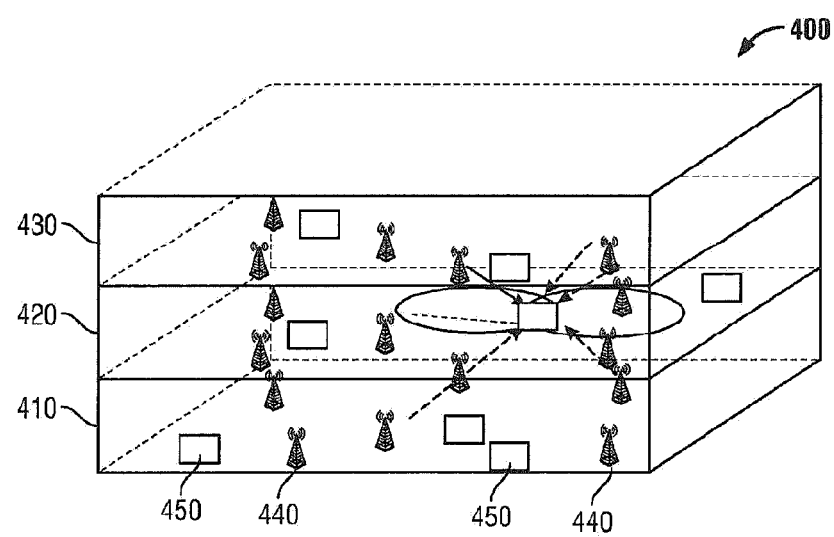
FIG. 8 illustrates a three story building in which a small cell network according to present principles may be deployed.

FIG. 8 shows a building 400 having three floors 410, 420 and 430. A small cell RAN network is to be deployed for an enterprise in the building. As shown, RNs 440 and UEs 450 are randomly placed over the floors.

Clustering is performed in the RNs 440 using Ward's Agglomerative Hierarchical Clustering Algorithm. This algorithm is chosen as being a suitable clustering algorithm which can be used with a relative metric such as pair-wise RSRPs or associated RF pathloss (i.e., topology), which is used as the input to the algorithm. Since the RNs are deployed over 3 floors the number of clusters is set to three to check if the algorithm autonomously separates RNs on different floors.

Figure 9B:
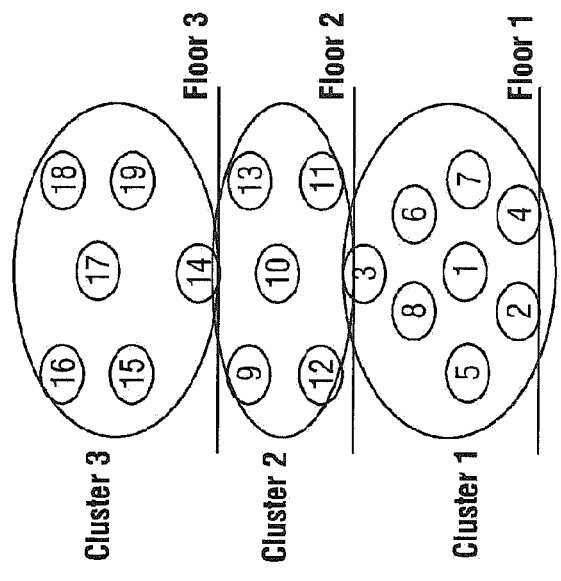
FIGS. 9a and 9b illustrate exemplary results of a clustering process performed on the RNs in the small cell network of FIG. 8.
Figure 9A:
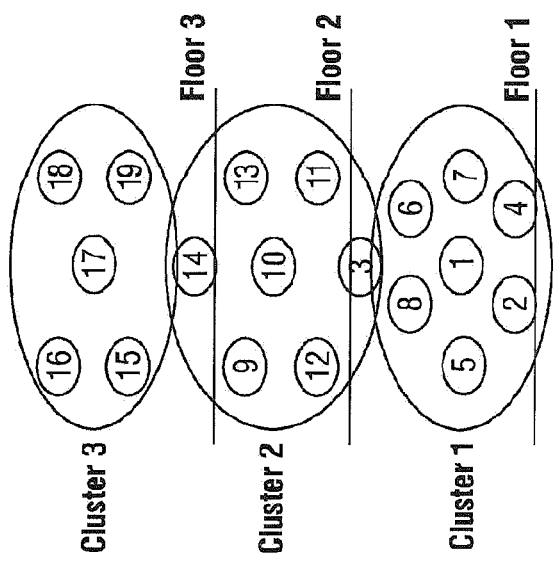
Figure 10:
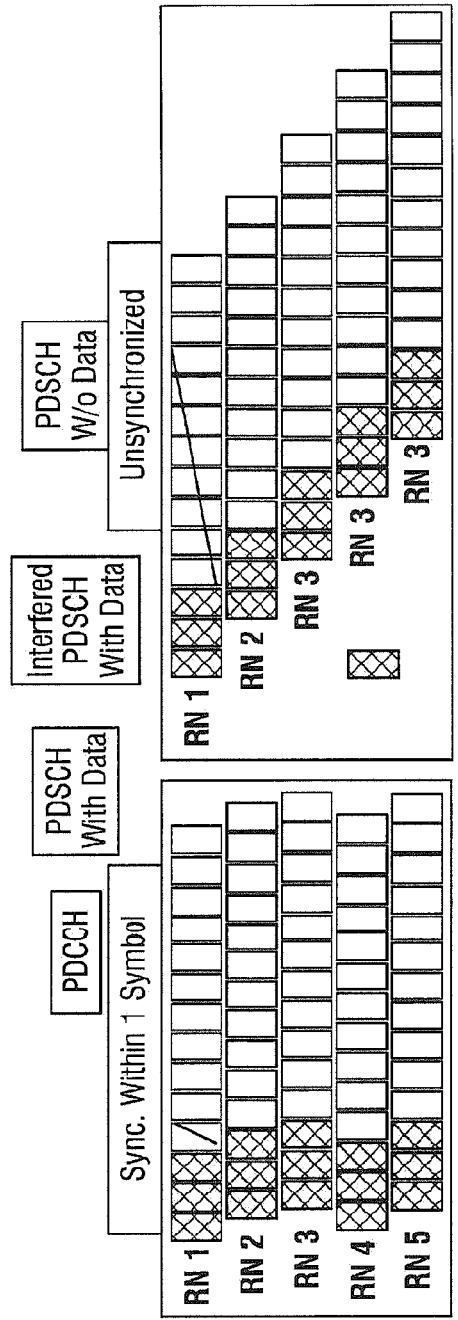
FIG. 10 illustrates the impact of synchronization of control channels by the RNs.

An illustration of the clustering results on a random drop modelling a deployment of radio nodes is given in FIG. 9a for a 10 dB penetration loss between floors and in FIG. 9b for a 20 dB penetration loss between floors. The results show that even with only a relative metric such as pair-wise RSRPs between RNs, the Ward's Agglomerative Hierarchical Clustering Algorithm can sufficiently recognize and separate RNs on different floors. The 'errors' in the case of 10 dB penetration loss might occur on those RNs that are on the perimeters of floors. Two RNs are misplaced in clusters when the penetration loss is 10 dB, while RNs on the same floors are grouped together correctly when the penetration loss is 20 dB. This may be perfectly normal, and not an error as RNs are to be grouped based on their topology and not their physical floor location. In that sense, in an actual deployment, a clustering algorithm autonomously accounts for any variations in different indoor deployments.

In one method, a clustering algorithm may use any available side information, in addition to autonomously measurable RF metrics, to improve the performance of the algorithm. For example, GPS coordinates and floor information can be used as the additional side information. These may in turn be available from a GPS receiver or some of this information corresponding to each RN may be manually input/configured at the SN or RNs.

Although the FFR schemes belong to frequency-domain interference coordination techniques, synchronization should still be considered. This is because that Physical Downlink Control Channel (PDCCH) in LTE occupies the entire bandwidth (with a distributed allocation of resources), and the FFR scheme is primarily employed for Physical Downlink Shared Channel (PDSCH). If RNs are not perfectly synchronized with each other, the PDCCH of a RN could interfere with the PDSCH of nearby RNs even if FFR schemes are configured. An illustration of the impact of synchronization is given in FIG. 10. For example, under frequency domain duplex (FDD) mode and Type 1 frame structure [3GPP 36.211], the duration of a sub-frame includes 14 OFDM symbols. Typically, the PDCCH occupies the first 3/14 fraction of the time of a sub-frame, i.e., 3 OFDM symbols. Under FFR schemes, if RNs are synchronized within an OFDM symbol, the performance loss when compared with the case of perfect synchronization is approximately bounded by 1/11. This is because at most 1 out of 11 OFDM data symbols are compromised by the interference from the PDSCHs of adjacent cells. However, the impact could be significant without synchronization as shown on the right in FIG. 10.

In one method, information related to synchronization is used in the design of FFR patterns. For example, such information could include the expected or measured timing error statistics, where such timing error is the difference in sub-frame start timing among RNs. In another example, physical control channel configuration information could be used in the design of FFR patterns. Such control configuration information could include, but not limited to number of resources allocated to control channel (like number of OFDM symbols in the downlink), usage statistics or load of the control channel region of individual RNs.

Figure 11:
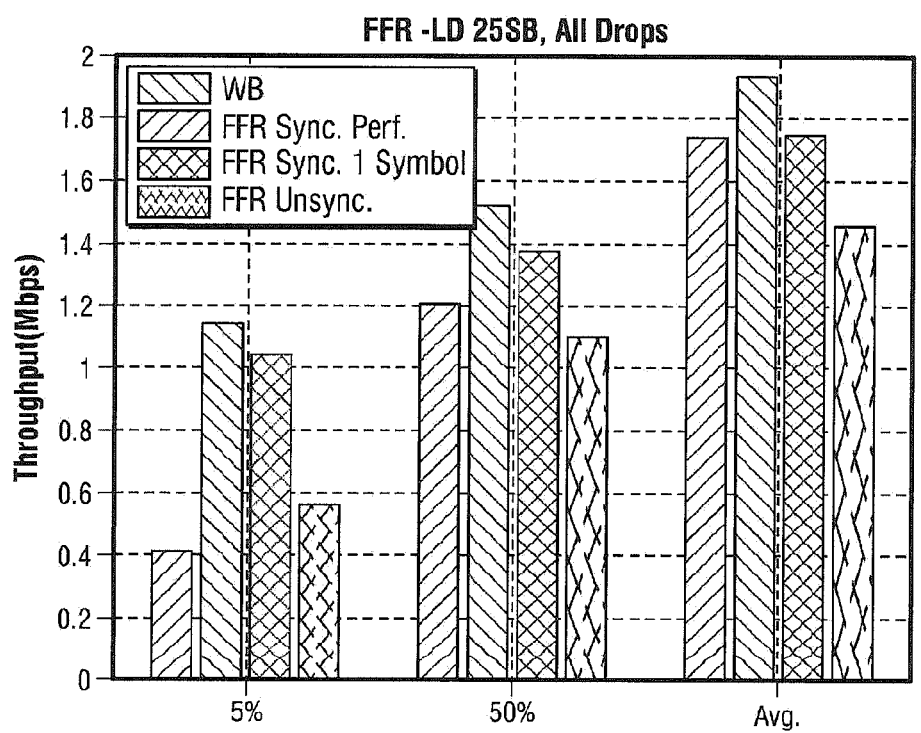
FIG. 11 illustrates improved throughput with synchronization.

FIG. 11 illustrates a set of exemplary effects of synchronization on edge, median, and mean user throughput. As may be seen, FFR deployments which are perfectly synchronized provide best performance, however those with synchronization within one OFDM symbols still provide a significant improvement on edge user throughput because the loss when compared with the perfect synchronization scenario is approximately bounded by 1/11. However, the worst case of no synchronization reduces the gains of FFR, in some cases significantly. The actual performance losses are somewhere in between, and depends at least on the level of synchronization achieved in practice and the control loading.

Below are described systems and methods according to present principles in which the above-described components are employed in a scheduler emulation in order to determine optimum or optimized clustering as well as FFR patterns. Once optimized, the parameters can be employed by a RN in scheduling.

Figure 12:
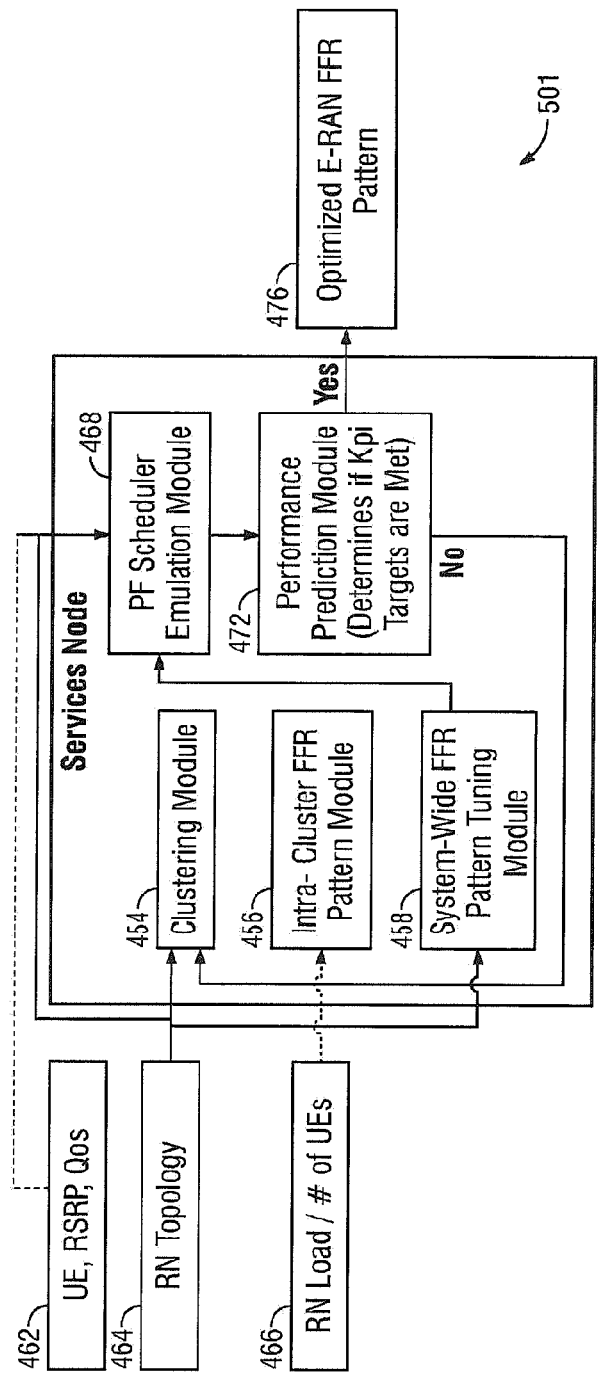
FIG. 12 schematically illustrates an exemplary SN according to present principles.

FIG. 12 illustrates an exemplary SN 501. Various modules are shown, as have been described. In particular, the SN 501 includes a clustering module 454, which takes as an input the RN topology 464. Another module shown is an intra-cluster FFR pattern generation module 456, which takes as an input the RN load 466, e.g., the number of UEs serviced by the RN. Another module illustrated is a systemwide FFR pattern tuning module 458, which also takes as an input the RN topology 464.

A scheduler emulation, e.g., using PF, round robin, or QOS, may then be run based on the generated and tuned PPR pattern and associated clusters. For this purpose a PF scheduler emulation module 468 is hypothesized and included in the SN 501, such taking as an input the proposed and tuned FFR pattern, as well as the RN topology 464 and information about UEs, including potentially R SRPs and QoS. The PF scheduler emulation module 468 is employed to estimate system performance KPIs with a hypothetical FFR pattern in each RN. The output is used to generate the targeted KPI metrics.

Once the scheduler emulation is run, a performance prediction module 472 determines if the desired threshold KPI metrics are met. If so, the result is an optimized or acceptable E-RAN FFR pattern 476. If not, at least some of the steps of clustering and pattern generation may be repeated. In this way, the SN selects the FFR pattern that meets and/or improves or otherwise optimizes the performance metrics. The key performance metrics may include the cell packet throughput, 5% cell edge user throughput, and user throughput CDF, as well as other appropriate metrics. Another set of preferred metrics are related to handover between cells including call drop ratio, call setup success rate, radio link failure rate, handover delay etc. These are typically improved by improving cell-edge performance. The selected FFR pattern that meets and optimizes the targeted KPI metrics is distributed to individual RNs.

In more detail, in a wireless network optimization, system performance is measured by a set of KPIs. Requirements on these KPIs are essentially the targets for the system design and operation. The FFR algorithms discussed above ultimately serve this purpose. In one method, the measurements and statistics collected from the UEs are used to predict the KPIs by the noted emulation module included as part of the FFR algorithm. In one example, the RSR Ps reported by the UEs to individual RNs are used in the emulation to predict the SNR achieved at the UE for different FFR patterns. In a following step, the SNRs of all the served UEs at an RN along with an appropriate scheduler model (e.g., proportional fair ("PF") or round robin or QoS based schedulers) are used to predict the achieved rate CDP in that RN. Such rate distribution from the RNs can be combined to obtain a system-wide rate distribution which maps to the predicted KPIs. The FFR patterns can then be tuned or selected across the system to satisfy the KPI requirements. In one method, the reported CQIs from the UEs are used to correct and improve the SNR-to-rate mappings.

In one method, a feedback loop is used to ensure the KPI targets are met. The KPIs can be measured over a network at the SN and/or the RNs and are input to the FFR algorithm module. One or more KPTs may be selected as the target KPIs and FFR patterns may be readjusted if the feedback KPIs do not satisfy the requirements. The accuracy of any prediction model is limited (in many cases a simple and straight-forward model is preferred) and the feedback loop helps to correct for biases that arise in real system operation due to dynamic channel and traffic behavior.

While certain values are discussed above, the KPIs could be in any categories of accessibility, mobility, retainability, integrity and availability and be any of the KPIs defined, for example as in 3GPP specification TS 32.450. The relative priority of these KPIs could be selected as an additional input for FFR algorithm optimization.

Figure 13:
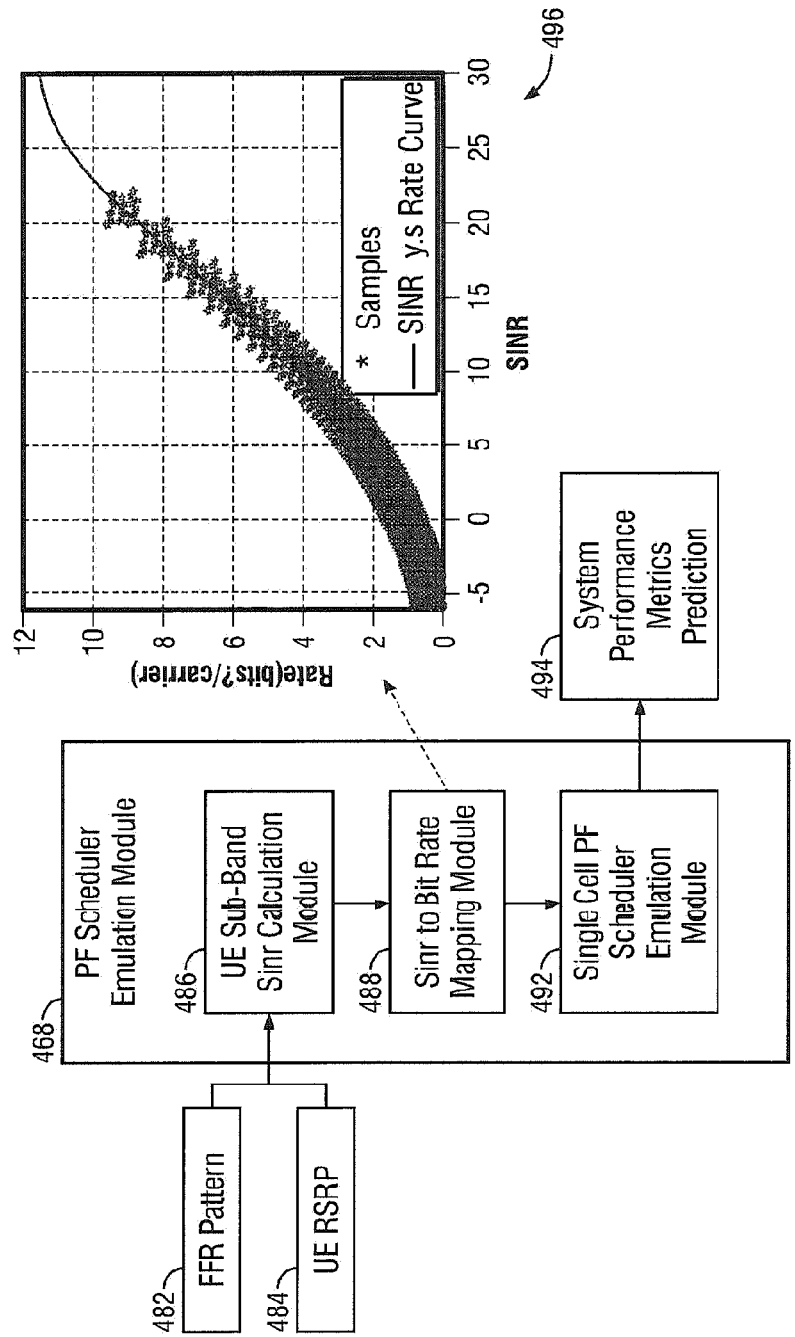
FIG. 13 schematically illustrates an exemplary scheduler emulation module according to present principles.

Additional details of the PF scheduler emulation module 468 are illustrated in FIG. 13. The module 468 models functionalities and capabilities within the E-RAN FFR scheme. The functionality approximately predicts the throughput of UEs associated with one or more RNs for a given FFR pattern. Inputs to the PF scheduler emulation module 468 include the FFR pattern 482 and the UEs RSRPs 484. The geometry/topology inputs (RSRPs 484) are employed in a UE sub-band SINR calculation module 486 to calculate long-term SINRs for all UEs with various different interference hypotheses. In particular an interference hypothesis corresponds to the ON/OFF setting of all the individual RNs for a sub-band given an FFR patterns, in which case the total interference is essentially the interference from all the active/ON RNs not including the serving RN. The ratio of received power from the serving RN to this interference results in the predicted SNR for that subband. That is, once the geometry and topology of the UEs is determined, as well as the FFR pattern, the same may be employed to calculate approximate values of SINR for the various UEs.

Once the SINRs are calculated, the same may be employed in order to obtain information about bit rates of the UEs. One way of performing this step is by a mapping, such as in the SINR-to-bit-rate mapping module 488 shown. A graph showing an exemplary mapping is illustrated by chart 496. The mapping functionality performed by the module 488 may implicitly take into account the rank adaptation. The mapping module 488 converts the per-subcarrier SINR to an estimated long-term per-subcarrier bit rate. The mapping used may be obtained from simulations and can be replaced with OTA data if needed. It is further noted that the mapping module 488 may employ UE CQI information to improve the prediction, if available, and/or the same may be used in lieu of a mapping.

A similar approach to scheduler emulation is also applicable to the uplink transmissions. For this case, the services node may additionally rely on measurements at radio nodes on the uplink reference signals like sounding reference signals (SRS). Such measurements could include the signal power measurements and the sub-band specific interference measurements on the uplink. SINR estimates can be obtained from these measurements, which can then be used for the scheduler emulation. The downlink UE RSRP measurements may also be used for uplink estimates (with the assumption of downlink/uplink reciprocity).

From the module 488, the predicted bit rates of the UEs associated with the RN are obtained. This information is then communicated to a single cell PF scheduler emulation module 492, which performs a PF scheduler emulation using the estimated sub-band rates of UEs to predict the behavior of the PF scheduler. By predicting the behavior of the PF scheduler, the expected performance metrics of the UEs may be obtained. The results of each cell are collected together to generate the predicted KPIs 494 of the entire system.

Figure 14:
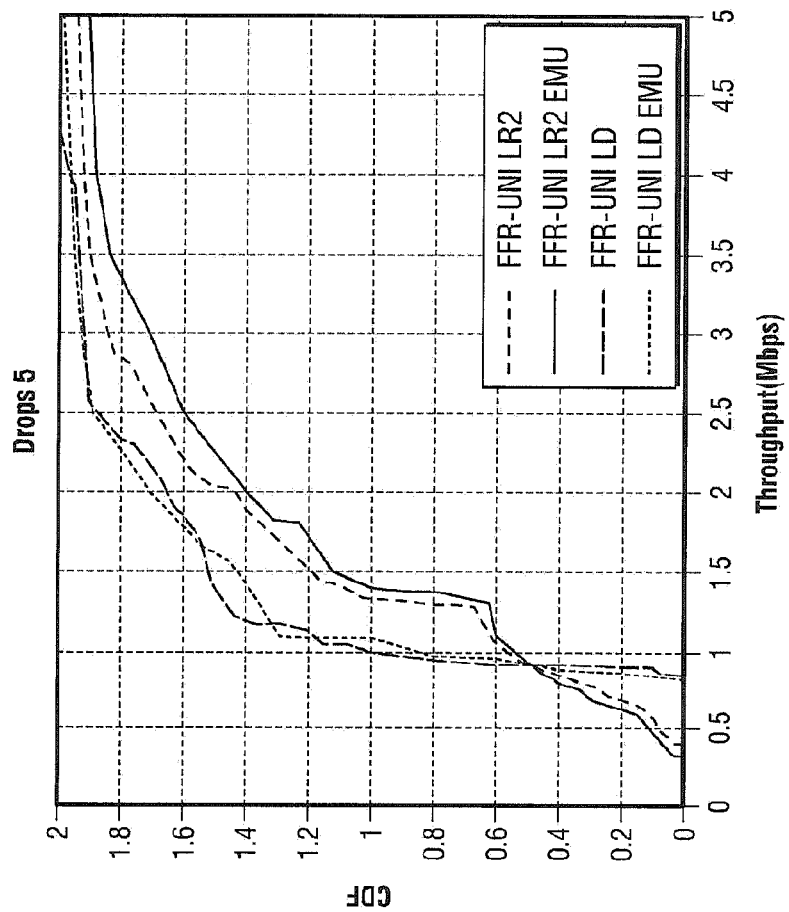
FIGS. 14 and 15 illustrate emulation verification for user throughput cumulative distribution function (CDF) as a KPI (FIG. 14) and an edge, median and mean user throughput as KPIs (FIG. 15).
Figure 15:
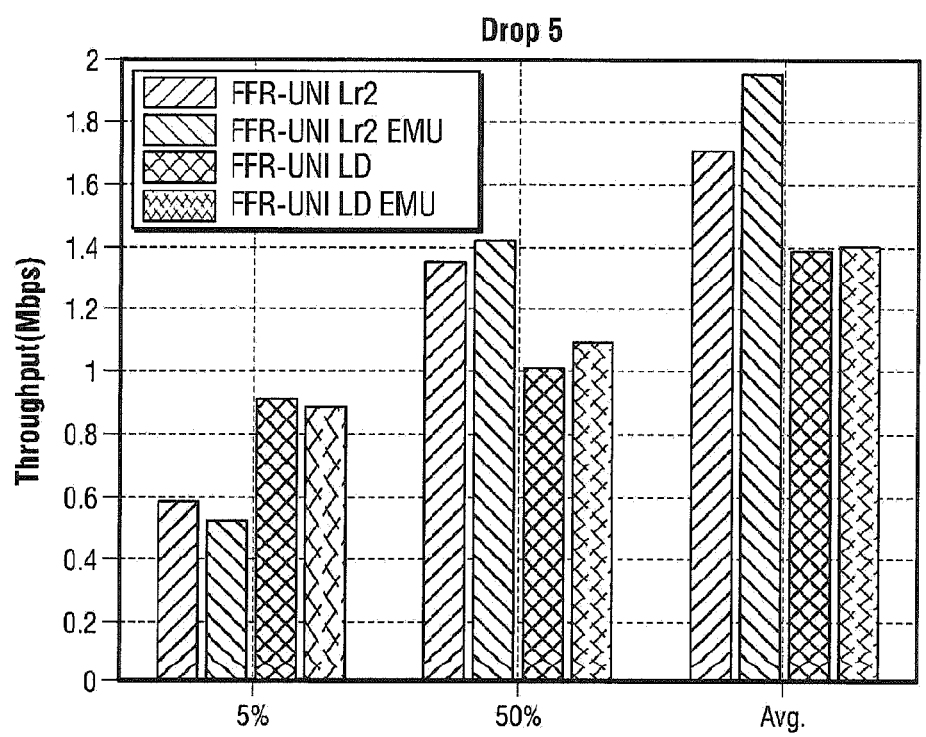

FIGS. 14 and 15 illustrate the results of an exemplary PF emulation. The results verify that the PF scheduler emulation can accurately track the performance of different FFR patterns. In the illustrated figures, a layout is used having a single floor with 8-9 RNs and 80 UEs. Two different FFR types are emulated: FFR-UNI LR2 and FFR-LD. Both patterns have center band sizes approximately 40% of the entire bandwidth. In FIG. 15, the emulation captures that FFR-UNI LR2 provides a higher median user throughput and average user throughput and further that the cell edge user throughput is lower when compared with FFR-LD. These aspects are also captured in the user throughput CDF graph in FIG. 14.

Figure 16:
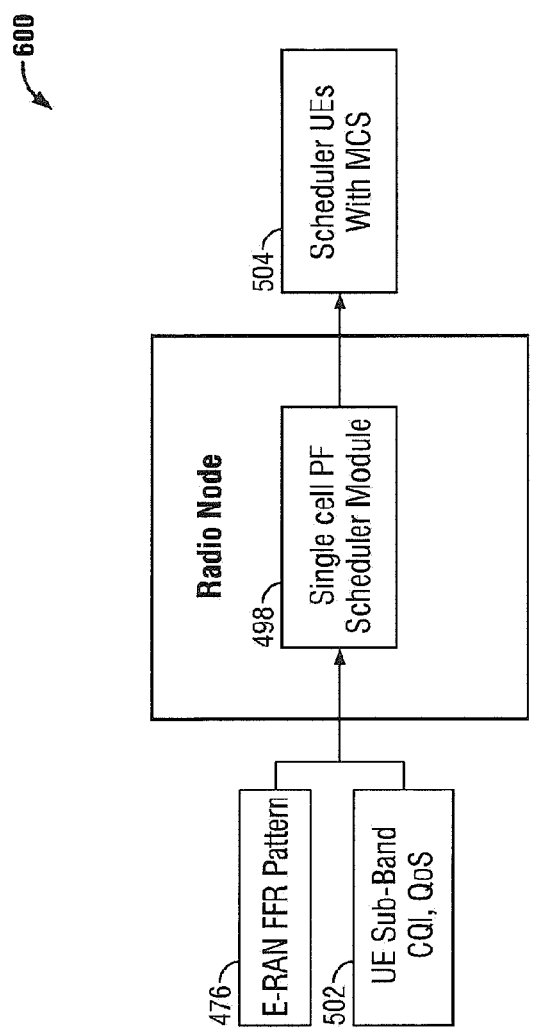
FIG. 16 is a schematic diagram of an exemplary RN according to present principles.

Once the results of the scheduler emulation have led to an optimized FPR pattern and clustering scheme, the optimized FFR pattern may be distributed to the RNs in the network, each of which is responsible for scheduling, a function that is expected to be performed generally independently of all other RNs. Referring to FIG. 16, a schematic of an RN is shown. A primary module that resides within an RN 600 is a single cell PF scheduler 498. Inputs to this module 498 include the optimized PPR pattern 476, as well as UE information 502 such as CQI, QoS, load, and the like. The output of the single cell PF scheduler module 498 is a set of scheduled UEs with appropriate modulation and coding schemes (MCS). The RNs 600 also determines users to be scheduled in a transmission time interval (TTI), as well as the corresponding allocated RBs in frequency.

Generally, in most implementations of present principles, users are divided within a cell into cell center users and cell edge users, with cell center users occupying low reuse bands, and cell edge users generally transmitting within high reuse bands, while adapting to dynamic channel and load variations. At least two methods may be employed to accomplish this. In a first exemplary method, the FFR scheme explicitly partitions users into cell center users and cell edge users. In a second exemplary method, the PF scheduler module 498 automatically directs the traffic of cell edge users to high reuse bands using the sub-band CQT information, which results in a "soft partition" of center users and edge users.

In more detail, separate downlink and uplink schedulers at each RN may be employed to schedule transmissions on each cell according to the assigned FFR pattern. Cell edge resources can be used for transmission to and from UEs that are geographically distant from the cell center or can be used to provide increased spectral efficiency and/or lower packet error rate for high priority messages or users, such as for handover between cells or for UEs that require a guaranteed bit rate.

When cell edge resources are used for transmission to and from users that are geographically distant from the cell center, the UEs can be partitioned into cell center and cell edge based on an absolute criterion such as a wideband CQI threshold, an RSRP threshold, or a threshold based on the difference between the cell center and the cell edge sub-band CQT. Alternatively, frequency-selective scheduling can be used to allocate cell center and cell edge resources directly to UEs based on their sub-band CQI reports.

The MCS used for transmission by the cell or UE may be matched to the channel conditions to achieve reliable communication. One challenge with FFR schemes is the fact that cell center and cell edge resources often exhibit different levels of interference. To account for this, the schedulers in each RN keep track of separate outer loop link adaptation (OLLA) biases for transmission on cell center and cell edge resources. The downlink scheduler computes separate cell center and cell edge biases for each UE. The uplink scheduler computes and stores a single OLLA bias for each UE, in addition to keeping track of the difference in received interference power between cell center and cell edge resources. When scheduling transmission to and from a UE, the appropriate OLLA bias is used to select the MCS based on whether the transmission uses cell center or cell edge resources.

Figure 17:
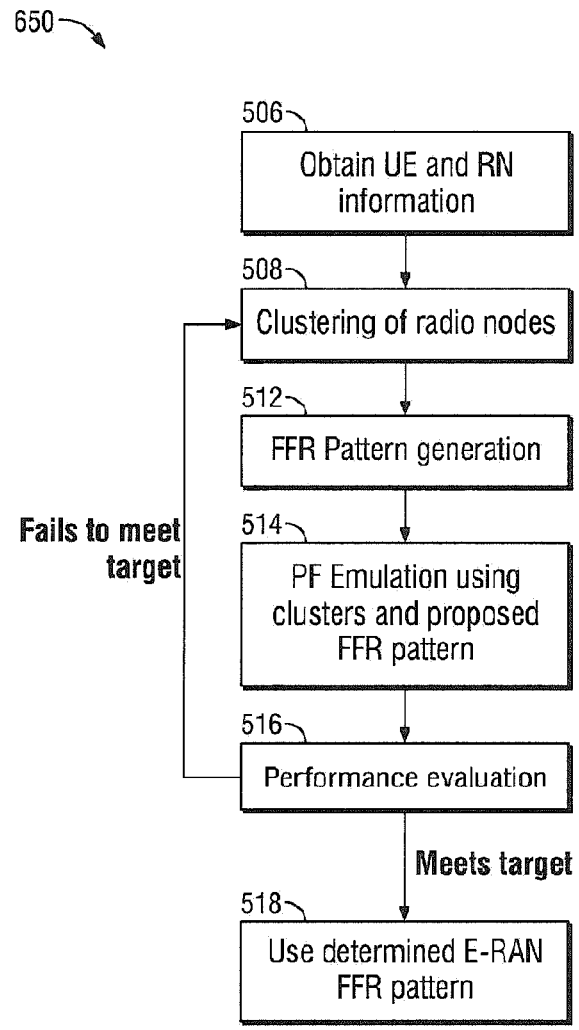
FIG. 17 is a flowchart illustrating a method according to present principles.

FIG. 17 is a flowchart 650 of an overall method according to present principles, the individual steps of which are described in greater detail above. A first step is the obtaining of UE and RN information (step 506). Such may include various information including RSRPs, load, topology, geometry, QoS, CQI, and the like. A next step is the clustering of the RNs (step 508). In this step the RNs are divided into clusters, where such clustering is intended to be configured such that the interference between RNs in the same cluster is more significant than the interference between RNs in different clusters.

A next step is the FFR pattern generation (step 512), where FFR patterns are generated for each cluster. The center bands of the FFR patterns of all clusters may be aligned, and the combination of the FFR patterns of all RNs forms the pattern for the entire system.

The step of scheduling emulation is then performed (step 514), this step employing the clusters in the proposed FFR patterns. This step estimates the sub-band bit rates for all UEs, and performs an emulation such as a PF emulation for each cell using the estimated bit rates.

The results are then combined to obtain systemwide performance metrics or KPIs which are then evaluated (step 516). If the systemwide performance metrics do not meet or exceed threshold values, one or more of the preceding steps may be repeated using adjusted clustering parameters, adjusted FFR patterns, or the like. For example, if the edge user throughput does not meet the target, the size of the center band may be decreased. Once the systemwide performance metrics meet or exceed threshold values, the determined FFR pattern may be deployed to the actual system (step 518). For example, the determined FFR pattern may be distributed to the various RNs for use in their PF scheduling.

Figure 18:
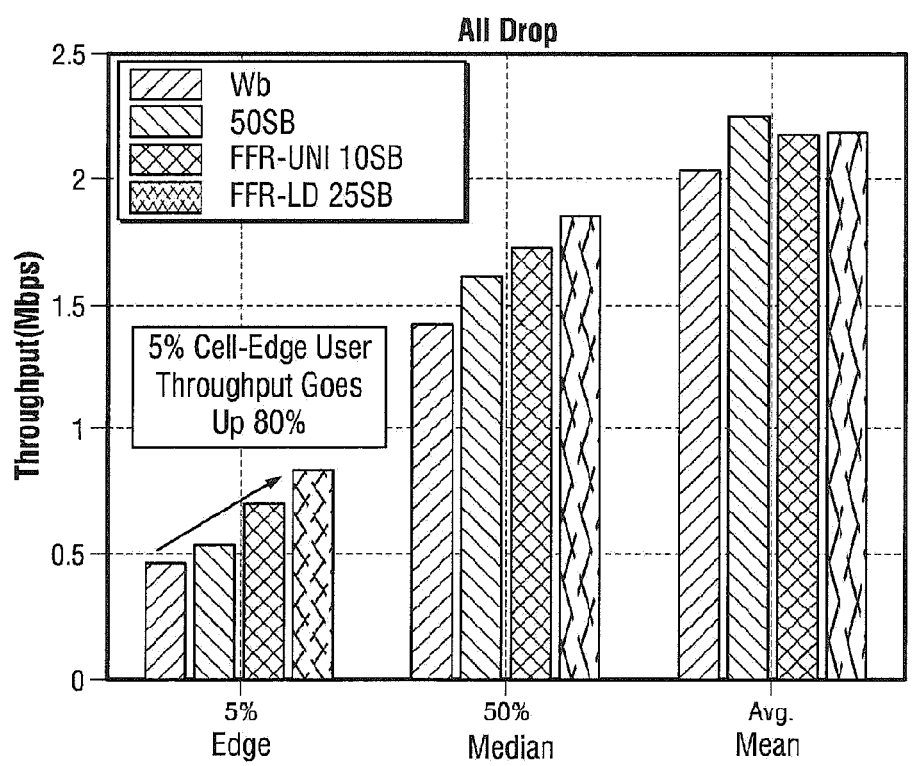
Figure 19:
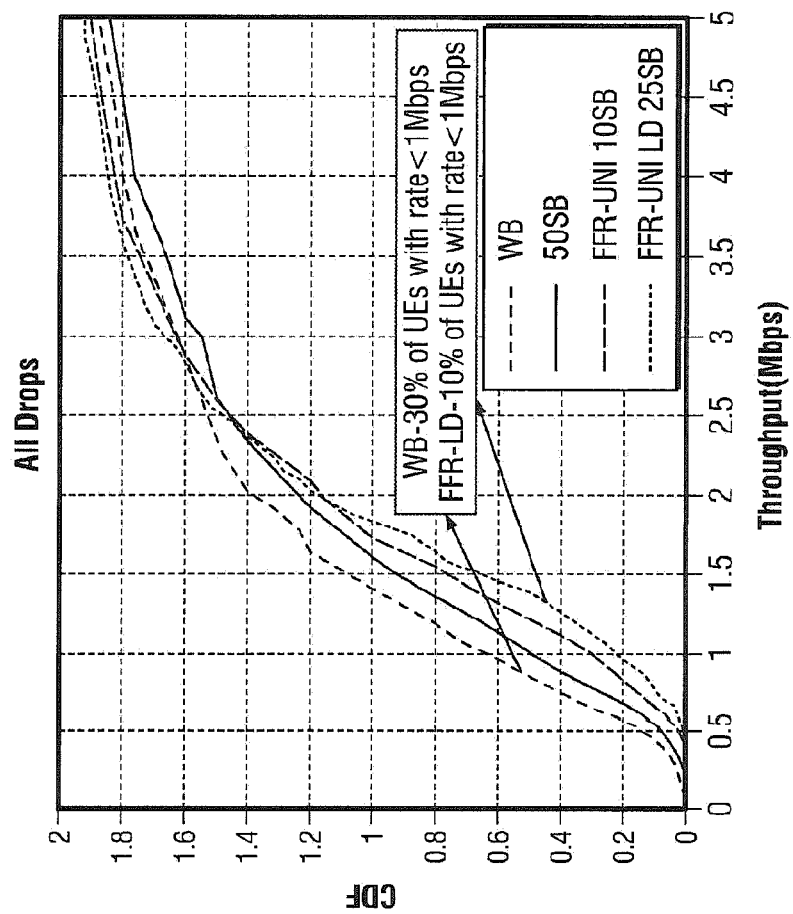

Certain exemplary results of systems and methods according to present principles are illustrated in FIGS. 18-20. In particular, FIG. 18 illustrates a significant increase in 5% cell edge throughput, which may be one of the KPI metrics optimized, by the use of the disclosed clustering and FFR techniques. Another suitable KPI metric for optimization includes the user throughput CDF, as illustrated in FIG. 19. Not only does the CDF of the FFR samples exceed others, a significant decrease in the percentage of users with low rates is seen. A qualitatively similar decrease in low-throughput users is illustrated by the table of FIG. 20. Conversely, FIG. 21 illustrates how 5% cell edge user throughput increases with the proposed FFR schemes.

Figure 22A:
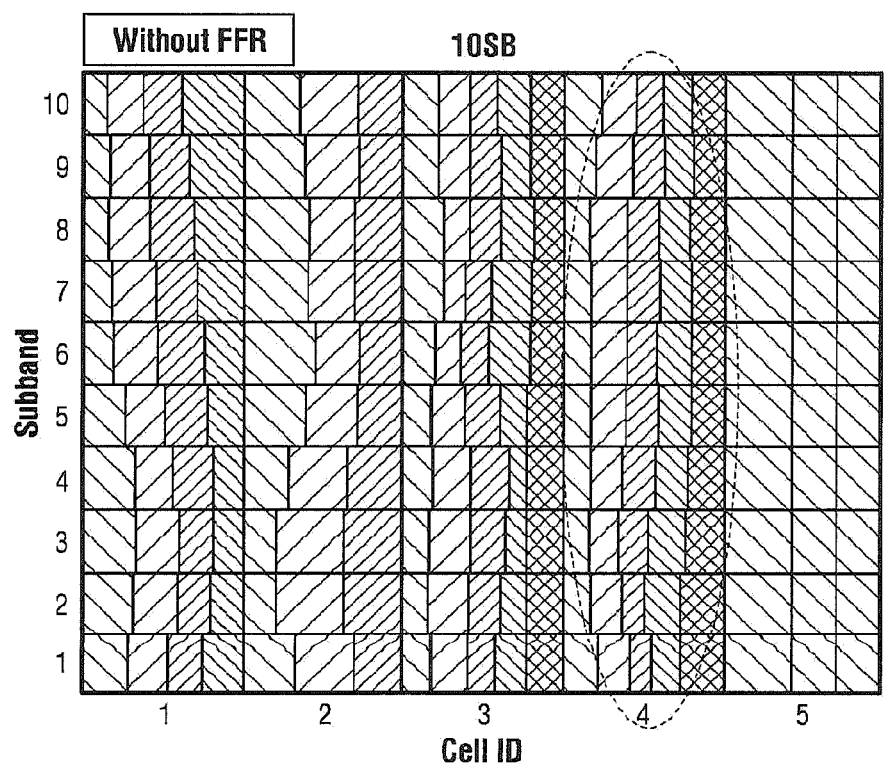
FIGS. 22A and 22B show how exemplary FFR schemes can be employed to cause a soft partitioning between center and edge users.
Figure 22B:
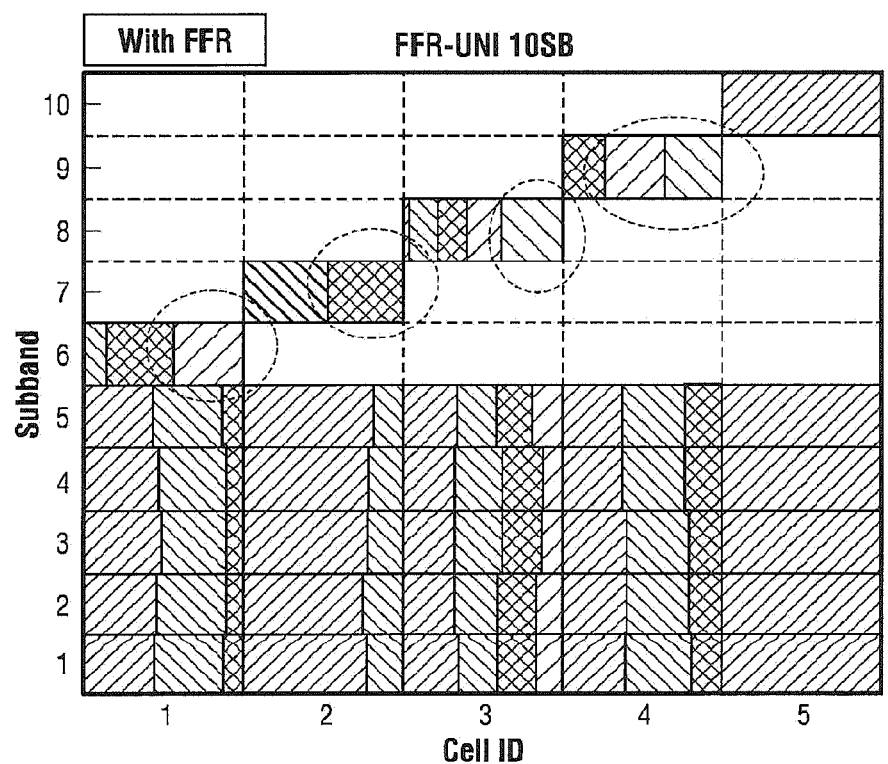

As noted above with respect to FIG. 16, the single cell PF scheduler in the E-RAN FFR scheme may be employed to cause a soft partitioning between the center and edge users. An example of such soft partitioning is illustrated in FIGS. 22A and 22B, in which a system is shown with five RNs, 18 UEs, and 10 sub-bands (SB). The FFR pattern employed has five edge bands (sub-bands 6-10) and each sub-band is dedicated to a single RN. The blue, pink, yellow, green, and red areas correspond to the portion of the time that the UEs in a cell with the highest, second to highest, third-highest, second to lowest, and the lowest throughput are scheduled in each sub-band, respectively.

From the figure, it may be seen that without FFR, UEs in a cell share the resource evenly, while with FFR, the PF scheduler automatically directs the traffic of cell edge users to high reuse bands and cell center users to center bands. In this system, explicitly defining cell edge and cell center users thresholds are avoided, which may be advantageous in some implementations since tuning such thresholds adds additional complication and is deployment-specific. It is further noted that other UE-specific or RN-specific QoS or other waiting considerations may also be incorporated into the scheduling framework.

The soft partitioning of users to the cell-edge and cell-center sub-bands is facilitated by the availability or prediction of the sub-band (or transmission frequency) specific CQIs and using these in a proportional fair type scheduler as a predicted rate. Cell-edge users that benefit most from reduced interference in cell-edge bands are scheduled in those bands, as a natural result of the dynamics of the proportional fair scheduler. A proportional fair scheduler is expected to schedule users in their "best" sub-bands most of the time.

Figure 23:
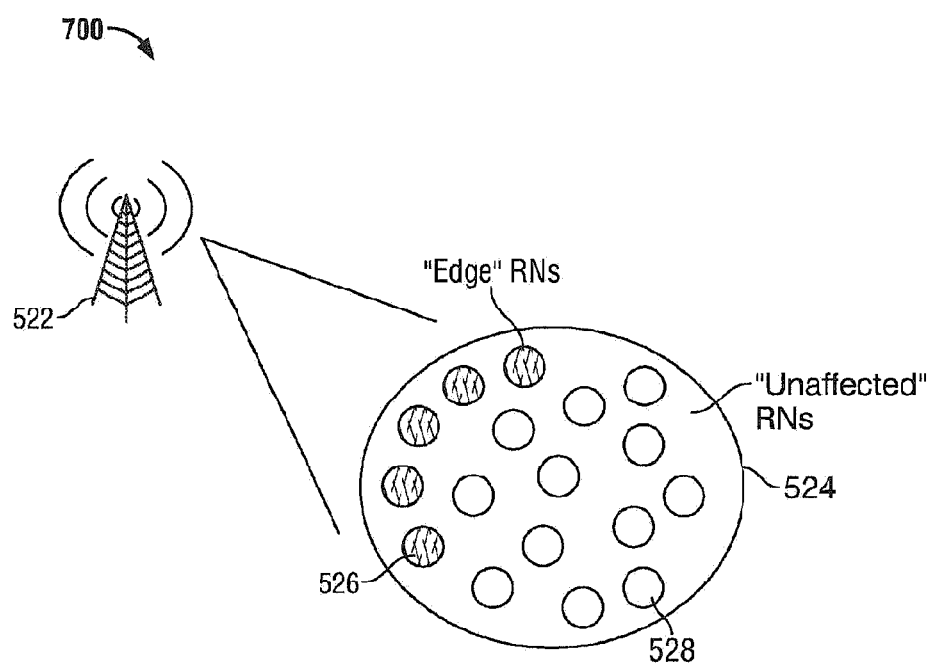
FIG. 23 illustrates a macro cell in proximity with an E-RAN.

FIG. 23 illustrates how systems and methods according to present principles may be affected by the presence of near or adjacent macro cells. These methods in general can also be applied to any external cells (like picas, micros, or isolated small cells or femtos, that are not controlled by the services node). In the system 700 shown in the figure, a macro cell 522 is near or adjacent (at least near enough to interfere) with an E-RAN 524. In particular, the macro cell 522 interferes with certain edge RNs 526, leaving other RNs 528 unaffected.

In this regard it is noted that in an enterprise RAN deployment with a centralized control/SN, macro cells can communicate with a single point instead of each of the small cells. This allows the SN to impose ICIC restrictions on "edge-cells" that are in the macro-interference region so as to affect their efficiency only "as needed". This is illustrated in the figure below. As shown, most of the RNs in the indoor network are not affected due to penetration loss in the building. Further, the SN can jointly configure ICIC schemes within the small-cell network taking such into account.

Various solutions are possible. In one, the macro cell 522 can communicate a first interference information, in particular, sub-bands that can expect to see higher interference from the macro cell, and thus allowing the small cell network to avoid transmissions in such sub-bands. In another solution, the macro cell 522 can communicate a second interference information, in particular, sub-bands for which the macro cell 522 expects to lower its own transmission level (i.e., to use a lower transmit power or duty cycle of transmissions), and thus which can then preferentially be used by the small cell network.

An example of the first interference information is the uplink High Interference Indicator (HII), which is essentially a mechanism indicating an intention of neighboring cells to schedule high power in specific bands, e.g., to imply transmission from cell-edge UEs. An example of second interference information is a downlink Relative Narrow Band Transmit Power (RNTP), defined in the LTE specifications, which is defined as the expectation of a cell to reduce transmit power in certain RBs communicated to neighbor cells. While these two examples relate to the frequency domain and are part of the ICIC specification in LTE, similar time domain examples exist and can also be employed. For example, information of Almost Blank Subframes (ABS) is an example of second interference information of subframes in the time domain, where the macro cell does not transmit, or transmits at reduced power, while information of Non-ABS subframes is an example of first interference information, i.e., of subframes in the time-domain that the macro cell will likely transmit at full or higher power. Similar examples combining time and frequency information may also be used. In some cases, such information need not be explicitly communicated by the macro cell network, but instead measured by the small cell network and used accordingly.

In one exemplary implementation, a small cell network (e.g., the FFR modules in the SN), use the above information in the design of the FFR patterns for the individual small cells. In one method, they use the information to restrict or allow transmissions in a subset of edge-cells (or border cells) within the entire small cell network. Such border cells may be defined based on the one or more of several measurements between the small cells and the macro cell, and/or from the UEs connected to the small cell or the macro cell. Examples of such measurements include RSRPs, SNRs, or similar signal and interference level measurements. RSRPs may be available at the UEs from macro cell measurements and at the small cells/RNs from performing sniffer measurements of neighboring macro cells. In another method, the small cell network may use the first and/or second interference information to define cell-edge or cell-center bands for the FFR pattern design.

In a specific example, the first interference information of highly-interfered sub-bands could be used as a cell-center region (at least in the border RNs, border clusters, or over the whole network) and the second interference information of low-interfered sub-bands could be used as a cell-edge region (again, at least in the border RNs, border clusters, or over the whole network). In one method, the cell-edge bands assigned to a border or other RN within the cell-edge region of the corresponding RN cluster (as defined in earlier embodiments) could be chosen to be the sub-band with the least expected macro cell interference. In another specific example, the FFR algorithm may consider the detected macro cells at the border RN (or more generally any RN), and the available first or second interference information of the corresponding macro cells, as bases in which to choose the cell-edge sub-band.

What has been disclosed are FFR schemes to improve the performance of E-RANs, in particular targeting a better cell edge user experience. Advantages of certain implementations according to present principles may include one or more of the following. Certain implementations are scalable with clustering, and are expected to retain performance gains for large deployments. Certain implementations support autonomous FFR pattern selection and optimization based on RN topology, load, and channels. Certain implementations allow inputs of KPIs and deployment specific parameters. Certain implementations minimize inputs to the RN's scheduler to allow generally autonomous RN operation. Simulation results show the effectiveness of the proposed schemes, which improve cell edge users throughput significantly, while maintaining user throughput in many cases.

Several aspects of telecommunication systems will now be presented with reference to various apparatus and methods described in the foregoing detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionalities described throughout this disclosure. One or more processors in the processing system may execute software.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on non-transitory computer-readable media. Non-transitory computer-readable media may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable non-transient media for storing or transmitting software. The computer-readable media may be resident in the processing system, external to the processing system, or distributed across multiple entities including the processing system. Computer-readable media may be embodied in a computer-program product. By way of example, a computer-program product may include one or more computer-readable media in packaging materials. Those skilled in the art will recognize how best to implement the described functionality presented throughout this disclosure depending on the particular application and the overall design constraints imposed on the overall system.

Variations of the above described systems and methods will be understood to one of ordinary skill in the art given this teaching. For example, various measured parameters of UEs have been disclosed which bear on scheduling and other aspects, including RSRPs, CQI, QoS, and the like. Other parameters may also be employed, such as UE capabilities, a priority scheme for certain UEs, and the like.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of optimizing frequency allocation in a radio access network (RAN) that includes a plurality of radio nodes (RNs) each associated with a cell and a services node (SN) operatively coupled to the RNs, the method comprising:

dividing the RNs in the RAN into a plurality of clusters of RNs; generating a fractional frequency reuse (FFR) pattern for each cluster;

allocating transmission frequencies to the RNs in each cluster in accordance with the respective FFR pattern that is generated for each cluster;

estimating bit rates of one or more user equipments (UEs) associated with each cell;

performing a scheduling emulation within each cell using the estimated bit rates for the one or more UEs; and combining the results of the scheduling emulations for each cell to obtain a system-wide performance metric, and if the system-wide performance metric is less than a target threshold, then repeating one or more of the dividing, generating, allocating, estimating, performing, and combining steps, until the system-wide performance metric meets or exceeds the target threshold.

2. The method of claim 1, wherein the estimating bit rates includes:
calculating a signal to interference and noise ratio (SINR) for each UE; and
using a SINR-to-bit-rate map to determine the bit rate for each UE.

3. The method of claim 2, wherein the calculating a SINR includes using at least one of a geometry and topology of the UEs to calculate the SINR.

4. The method of claim 2, wherein the estimating bit rates further includes improving the estimation of the bit rates by using channel quality indicator (CQi) data reported by the UE.

5. The method of claim 2, wherein the estimating bit rates further includes improving an estimation of the bit rates by using measurement data on an uplink reference signal.

6. The method of claim 2, wherein the system-wide performance metric is selected from the group consisting of: cell packet throughput, 5% cell edge user throughput, user throughput cumulative distribution function (CDF), call drop ratio, call setup success rate, radio link failure rate, and handover delay.

7. The method of claim 2, wherein following the system-wide performance metric meeting or exceeding the target threshold, allocating transmission frequencies to the RNs in each cluster in accordance with the respective FFR pattern that resulted in the metric meeting or exceeding the target threshold, and performing a step of scheduling within each RN to allocate transmission frequencies to the UEs served by the RN.

8. The method of claim 2, wherein the system-wide performance metric includes the throughput of a cell edge user, and wherein the repeating the generating step includes modifying the size of the center band until the throughput of the cell edge user meets or exceeds the threshold.

9. The method of claim 1, wherein following the system-wide performance metric meeting or exceeding the target threshold, allocating transmission frequencies to the RNs in each cluster in accordance with the respective FFR pattern that resulted in the metric meeting or exceeding the target threshold.

10. The method of claim 9, comprising performing a step of scheduling within each RN to allocate transmission frequencies to the UEs served by the RN.

11. The method of claim 10, wherein the step of scheduling directs cell edge users to high reuse bands and cell center users to low reuse bands.

12. The method of claim 11, wherein the step of scheduling is at least partially based on UE-specific information.

13. The method of claim 12, wherein the DE-specific information includes at least one member selected from the group consisting of: CQI, load, and quality of service (QoS) parameters.

14. The method of claim 10, wherein the system-wide performance metric includes the throughput of a cell edge user, and wherein the repeating the generating step includes modifying the size of the center band until the throughput of the cell edge user meets or exceeds the threshold.

15. The method of claim 10, wherein the estimating bit rates further includes improving the estimation of the bit rates by using channel quality indicator (CQi) data reported by the UE.

16. The method of claim 10, wherein the estimating bit rates further includes improving an estimation of the bit rates by using measurement data on an uplink reference signal.

17. The method of claim 1, wherein the system-wide performance metric includes the throughput of a cell edge user, and wherein the repeating the generating step includes modifying the size of the center band until the throughput of the cell edge user meets or exceeds the threshold.

18. The method of claim 1, wherein the scheduling emulation includes proportional fairness (PF) scheduling emulation, round-robin scheduling emulation, or QOS based scheduling emulation.

19. The method of claim 1, wherein the estimating bit rates further includes improving the estimation of the bit rates by using channel quality indicator (CQi) data reported by the UE.

20. The method of claim 1, wherein the estimating bit rates further includes improving an estimation of the bit rates by using measurement data on an uplink reference signal.

21. The method of claim 1, wherein the system-wide performance metric refers to a downlink transmission.

22. The method of claim 1, wherein the system-wide performance metric refers to an uplink transmission.

23. The method of claim 1, wherein the transmission frequencies are frequencies used for downlink transmission.

24. The method of claim 1, wherein the transmission frequencies are frequencies used for uplink transmission.

25. The method of claim 1, wherein the system-wide performance metric is selected from the group consisting of: cell packet throughput, 5% cell edge user throughput, user throughput CDF, call drop ratio, call setup success rate, radio link failure rate, and handover delay.

* * * * *